(12) United States Patent
Losego et al.

(10) Patent No.: US 11,680,146 B2
(45) Date of Patent: Jun. 20, 2023

(54) HYBRID MEMBRANES AND METHODS OF MAKING AND USE THEREOF

(71) Applicant: GEORGIA TECH RESEARCH CORPORATION, Atlanta, GA (US)

(72) Inventors: Mark D. Losego, Atlanta, GA (US); Ryan P. Lively, Atlanta, GA (US); Emily K. McGuinness, Atlanta, GA (US); Fengyi Zhang, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 384 days.

(21) Appl. No.: 16/760,125

(22) PCT Filed: Oct. 31, 2018

(86) PCT No.: PCT/US2018/058347
§ 371 (c)(1),
(2) Date: Apr. 29, 2020

(87) PCT Pub. No.: WO2019/089687
PCT Pub. Date: May 9, 2019

(65) Prior Publication Data
US 2020/0325295 A1    Oct. 15, 2020

Related U.S. Application Data

(60) Provisional application No. 62/579,443, filed on Oct. 31, 2017.

(51) Int. Cl.
*C08J 9/00* (2006.01)
*B01D 61/02* (2006.01)
(Continued)

(52) U.S. Cl.
CPC ............ *C08J 9/008* (2013.01); *B01D 61/027* (2013.01); *B01D 67/0072* (2013.01);
(Continued)

(58) Field of Classification Search
None
See application file for complete search history.

(56) References Cited

U.S. PATENT DOCUMENTS

| 8,623,928 B2 | 1/2014 | Du et al. |
| 2007/0137477 A1* | 6/2007 | Freeman ............... B01D 53/228 95/45 |

(Continued)

FOREIGN PATENT DOCUMENTS

| WO | 2003000774 | 1/2003 |
| WO | 2005012397 | 2/2005 |

OTHER PUBLICATIONS

Obuchovsky, Stas et al., "Mechanism of Metal Oxide Deposition from Atomic Layer Deposition inside Nonreactive Polymer Matrices: Effects of Polymer Crystallinity and Temperature", Chemistry of Materials, 28, Mar. 2016, pp. 2668-2676. (Year: 2016).*

(Continued)

*Primary Examiner* — Jason M Greene
(74) *Attorney, Agent, or Firm* — Meunier Carlin & Curfman LLC

(57) ABSTRACT

Disclosed herein are hybrid membranes comprising: a microporous polymer, the microporous polymer comprising a continuous polymer phase permeated by a continuous pore phase; and an atomic scale inorganic material dispersed throughout the microporous polymer within the continuous pore phase. Methods of making and use of the hybrid membranes are also disclosed.

20 Claims, 30 Drawing Sheets

(51) Int. Cl.

| | |
|---|---|
| *B01D 67/00* | (2006.01) |
| *B01D 69/10* | (2006.01) |
| *B01D 69/14* | (2006.01) |
| *B01D 71/02* | (2006.01) |
| *B01D 71/32* | (2006.01) |
| *B01J 20/08* | (2006.01) |
| *B01J 20/26* | (2006.01) |
| *B01J 20/28* | (2006.01) |
| *B01J 23/06* | (2006.01) |
| *B01J 31/06* | (2006.01) |
| *B01J 31/38* | (2006.01) |
| *B01J 35/06* | (2006.01) |
| *C08G 73/22* | (2006.01) |
| *C08J 5/18* | (2006.01) |
| *C08J 9/40* | (2006.01) |
| *C08K 3/22* | (2006.01) |

(52) U.S. Cl.
CPC ......... *B01D 69/10* (2013.01); *B01D 69/148* (2013.01); *B01D 71/022* (2013.01); *B01D 71/024* (2013.01); *B01D 71/32* (2013.01); *B01J 20/08* (2013.01); *B01J 20/262* (2013.01); *B01J 20/28033* (2013.01); *B01J 23/06* (2013.01); *B01J 31/06* (2013.01); *B01J 31/38* (2013.01); *B01J 35/065* (2013.01); *C08G 73/22* (2013.01); *C08J 5/18* (2013.01); *C08J 9/40* (2013.01); *C08K 3/22* (2013.01); *B01D 2323/40* (2013.01); *B01D 2323/46* (2013.01); *C08K 2003/2296* (2013.01)

(56) References Cited

U.S. PATENT DOCUMENTS

| | | | |
|---|---|---|---|
| 2010/0035047 A1* | 2/2010 | Ajayan | C08J 3/20 428/328 |
| 2016/0367948 A1* | 12/2016 | Song | B01D 69/148 |
| 2017/0274327 A1 | 9/2017 | Koros et al. | |
| 2018/0127870 A1 | 5/2018 | Losego et al. | |
| 2018/0304193 A1* | 10/2018 | Al-Maythalony | B01D 69/12 |

OTHER PUBLICATIONS

Azpitarte I et al. Suppressing the Thermal and Ultraviolet Sensitivity of Kevlar by Infiltration and Hybridization with ZnO. Chem. Mater. 2017, 29, 10068-10074.

Azpitarte I et al. Vapor phase infiltration: from a bioinspired process to technologic application, a prospective review. MRS Commun. 2018, 8, 727-741.

Budd PM et al. Gas permeation parameters and other physicochemical properties of a polymer of intrinsic microporosity: Polybenzodioxane PIM-1. J. Memb. Sci. 2008, 325, 851-860.

Budd PM et al. Solution-Processed, Organophilic Membrane Derived from a Polymer of Intrinsic Microporosity. Adv. Mater. 2004, 16, 456-459.

Cook M et al. Roll-to-roll dip coating of three different PIMs for Organic Solvent Nanofiltration. J. Memb. Sci. 2018, 558, 52-63.

Fritsch D et al. High-performance organic solvent nanofiltration membranes: Development and thorough testing of thin film composite membranes made of polymers of intrinsic microporosity (PIMs). J. Memb. Sci. 2012, 401-402, 222-231.

Gorgojo P. et al. Ultrathin Polymer Films with Intrinsic Microporosity: Anomalous Solvent Permeation and High Flux Membranes. Adv. Funct. Mater. 2014, 24, 4729-4737.

Ingram WF et al. Properties and Applications of Vapor Infiltration into Polymeric Substrates. JOM, 2019, 71, 238-245.

Jimenez-Solomon et al. Polymer nanofilms with enhanced microporosity by interfacial polymerization. Nature Materials, 2016, 15, 760-767.

Jue ML et al. Defect-free PIM-1 hollow fiber membranes. J. Memb. Sci. 2017, 530, 33-41.

Jue ML et al. Effect of Nonsolvent Treatments on the Microstructure of PIM-1. Macromolecules 2015, 48, 5780-5790.

Koh D et al. Reverse osmosis molecular differentiation of organic liquids using carbon molecular sieve membranes. Science, 2018, 353, 804-807.

Koh DY et al. Nanoporous graphene: Membranes at the limit. Nat. Nanotechnol. 2015, 10, 385-386.

Koros WJ et al. Water and Beyond: Expanding the Spectrum of Large-Scale Energy Efficient Separation Processes. AIChE J. 2012, 58, 2624-2633.

Kosinov N et al. Recent developments in zeolite membranes for gas separation. J. Memb. Sci. 2016, 499, 65-79.

Lee SM et al. Greatly increased toughness of infiltrated spider silk. Science, 2009, 324, 488-92.

Leng CZ et al. Vapor phase infiltration (VPI) for transforming polymers into organic-inorganic hybrid materials: a critical review of current progress and future challenges. Mater. Horizons, 2017, 4, 747-771.

Lively et al. From water to organics in membrane separations. Nature Materials. 2017, 16, 276-279.

Ma Y et al. Evidence for entropic diffusion selection of xylene isomers in carbon molecular sieve membranes. J. Memb. Sci. 2018, 564, 404-414.

Marchetti P et al. Molecular Separation with Organic Solvent Nanofiltration: A Critical Review. Chem. Rev. 2014, 114, 10735-10806.

McKeown NB. Polymers of Intrinsic Microporosity. ISRN Materials Science, vol. 2012, Article ID 513986, 16 pages.

Obuchovsky S et al. Mechanism of Metal Oxide Deposition from Atomic Layer Deposition inside Nonreactive Polymer Matrices: Effects of Polymer Crystallinity and Temperature. Chem. Mater. 2016, 28, 2668-2676.

Padbury RP et al. Effect of Polymer Micro structure on the Nucleation Behavior of Alumina via Atomic Layer Deposition. J. Phys. Chem. C, 2014, 118, 18805-18813.

Piercy BD et al. Tree-based control software for multilevel sequencing in thin film deposition applications. J. Vac. Sci. Technol. B, Nanotechnol. Microelectron. Mater. Process. Meas. Phenom. 2015, 33, 043201.

Sholl D et al. Seven chemical separations to change the world. Nature, 2016, 532, 435-437.

Subramanian A et al. Review of Recent Advances in Applications of Vapor-Phase Material Infiltration Based on Atomic Layer Deposition. JOM, 2019, 71, 186-196.

Tsarkov S et al. Solvent nanofiltration through high permeability glassy polymers Effect of polymer and solute nature. J. Memb. Sci. 2012, 423-424, 65-72.

Yang F. et al. Reversible and Irreversible Reactions of Trimethylaluminum with Common Organic Functional Groups as a Model for Molecular Layer Deposition and Vapor Phase Infiltration. Adv. Mater. Interfaces, 2017, 4(18), 1700237.

Yong WF et al. Suppression of aging and plasticization in highly permeable polymers. Polymer, 2015, 77, 377-386.

Zhang et al. Ultrasensitive carbon molecular sieve membranes with tailored synergistic sorption selective properties. Advanced Materials, 2017, 29(33), 1701631.

Zhang F et al. Solution-Based 3D Printing of Polymers of Intrinsic Microporosity. Macromol. Rapid Commun. 2018, 39, 1800274.

International Preliminary Report on Patentability issued for Application No. PCT/US2018/058347, dated May 14, 2020.

International Search Report and Written Opinion dated Jan. 16, 2019, from International Application No. PCT/US2018/058347, 10 pages.

\* cited by examiner

HYBRID MEMBRANES AND METHODS OF MAKING AND USE THEREOF

CROSS-REFERENCE TO RELATED APPLICATIONS

This application claims the benefit of U.S. Provisional Application No. 62/579,443, filed Oct. 31, 2017, which is hereby incorporated herein by reference in its entirety.

STATEMENT OF GOVERNMENT SUPPORT

This invention was made with government support under Grant No. CBET 1653153 and Grant No. ECCS-1542174 awarded by The National Science Foundation. The government has certain rights in this invention.

BACKGROUND

Advances in chemical separations are sorely needed, as these processes have an outsized energy and carbon footprint. In fact, 10-15% of worldwide energy consumption has been attributed to these processes. Membrane-based organic solvent separations promise a low-energy alternative to traditional thermal separations. Membranes thus have the potential to revolutionize energy and carbon savings in separations. However, because many of these separations must occur in challenging organic solvent environments, scalable and robust membrane materials that operate reliably in chemically aggressive environments are needed (Lively et al. Nature Materials, 2017, 16, 276-279). While inorganic membranes can withstand demanding conditions, they are costly and difficult to scale. Polymeric membranes can be easily manufactured into form factors consistent with large-scale separations (e.g., hollow fibers), but perform poorly in aggressive solvents. Membrane scientists and engineers have addressed this problem by either creating cross-linked polymer networks (Jimenez-Solomon et al. Nature Materials, 2016, 15, 760-767) or by carbonizing precursor membranes (Zhang et al. Advanced Materials, 2017, 29(33), 1701631; Koh et al. Science, 2016, 353(6301), 804-807). While somewhat effective, these methods also increase manufacturing complexity due to the need to process excess chemical waste or to operate high temperature pyrolysis equipment. Therefore, a need still exists for membranes that can be used in challenging separations. The compositions and methods described herein address these and other needs.

SUMMARY

In accordance with the purposes of the disclosed compositions and methods, as embodied and broadly described herein, the disclosed subject matter relates to hybrid membranes and methods of making and use thereof.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
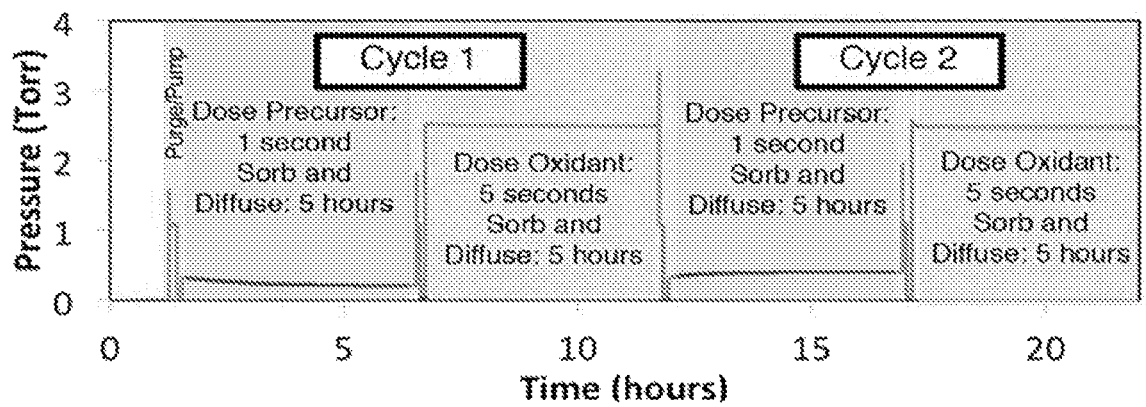
FIG. 1 is a plot of chamber pressure (as measured by a Baratron Capacitance Manometer) as a function of time in an exemplary VPI process.

The compositions and methods described herein may be understood more readily by reference to the following detailed description of specific aspects of the disclosed subject matter and the Examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Hybrid Membranes

Disclosed herein are hybrid membranes comprising: a microporous polymer, the microporous polymer comprising a continuous polymer phase permeated by a continuous pore phase; and an atomic scale inorganic material dispersed throughout the microporous polymer within the continuous pore phase.

"Phase," as used herein, generally refers to a region of a material having a substantially uniform composition which is a distinct and physically separate portion of a heterogeneous system. The term "phase" does not imply that the material making up a phase is a chemically pure substance, but merely that the chemical and/or physical properties of the material making up the phase are essentially uniform throughout the material, and that these chemical and/or physical properties differ significantly from the chemical and/or physical properties of another phase within the material. Examples of physical properties include density, thickness, aspect ratio, specific surface area, porosity and dimensionality. Examples of chemical properties include chemical composition.

"Continuous," as used herein, generally refers to a phase such that all points within the phase are directly connected, so that for any two points within a continuous phase, there exists a path which connects the two points without leaving the phase.

As used herein, an "atomic scale inorganic material" means that substantially no particles or crystals of the inorganic material are formed as determined by XRD and/or TEM. The hybrid membranes described herein comprise 1 wt % or less (e.g., 0.75 wt % or less, 0.5 wt % or less, 0.25 wt % or less, or 0.1 wt % or less) of particles comprising the inorganic material. The hybrid membranes described herein comprise 1 wt % or less (e.g., 0.75 wt % or less, 0.5 wt % or less, 0.25 wt % or less, or 0.1 wt % or less) of particles comprising the inorganic material, the particles having an average particle size of 1 nm or more.

Microporous polymers include, but are not limited to, polymers of intrinsic microporosity (PIMs), hypercrosslinked microporous polymers (HCPs), covalent organic frameworks (COFs), conjugated microporous polymers (CMPs), porous aromatic frameworks (PAFs), porous organic cages (POCs), and the like, for example as described in "Porous Polymers: design, synthesis and applications" by Qiu et al. (Qiu et al. "Porous Polymers: design, synthesis and applications," Royal Society of Chemistry, 2015).

In some examples, the microporous polymer can comprise a polymer of intrinsic microporosity. The polymer of intrinsic microporosity can comprise any suitable polymer of microporosity. For example, the polymer of intrinsic microporosity can comprise any of those described in "Polymers of Intrinsic Microporosity" by Neil B. McKeown (International Scholarly Research Network, volume 2012, article ID 513986, 16 pages, doi: 10.5402/2012/513986); U.S. Pat. No. 8,623,928; WO2003000774; and/or WO2005012397, each of which is hereby incorporated by reference herein in its entirety for its teaching on polymers of intrinsic microporosity. In some examples, the polymer of intrinsic microporosity can comprise PIM-1, PIM-2, PIM-3, PIM-4, PIM-5, PIM-6, PIM-7, PIM-8, PIM-9, PIM-10, KAUST-PI-X (e.g., KAUST-PI-1, KAUST PI-2), triptycene based polymers of intrinsic microporosity, derivatives thereof, or combinations thereof. In some examples, the polymer of intrinsic microporosity can comprise PIM-1 or a derivative thereof.

The inorganic material can, for example, comprise an inorganic oxide, and inorganic nitride, and inorganic carbide, and inorganic oxynitride, and inorganic oxycarbide, or combinations thereof. In some examples, the inorganic material can comprise a metal compound, a metalloid compound, or a combination thereof. For example, the inorganic material can comprise a metal oxide, a metal nitride, a metal carbide, a metal oxynitride, a metal oxycarbide, a metalloid oxide, a metalloid nitride, a metalloid carbide, a metalloid oxynitride, a metalloid oxycarbide, or combinations thereof.

For example, the inorganic material can comprise a metal selected from the group consisting of Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. In some examples, the inorganic material can comprise a metalloid selected from the group consisting of Si, Ge, As, Sb, Te, and combinations thereof. In certain examples, the inorganic material can comprise a metal or a metalloid selected from the group consisting of Al, Zn, Ti, Hf, Zr, Ta, Y, Si, and combinations thereof.

In some examples, the inorganic material can comprise a metal oxide, a metalloid oxide, or a combination thereof. In certain examples, the metal oxide, metalloid oxide, or combination thereof can comprise a metal or metalloid selected from the group consisting of Al, Zn, Ti, Hf, Zr, Ta, Y, Si, and combinations thereof. For example, the inorganic material can comprise ZnO, $Al_2O_3$, $TiO_2$, $HfO_2$, $ZrO_2$, $Ta_2O_5$, $Y_2O_5$, $SiO_2$, $Ir_2O_3$, $RuO_2$, $WO_3$, $Ni_2O_3$, or a combination thereof.

The inorganic material can, in some examples, be dispersed substantially homogeneously throughout the hybrid membrane. In some examples, the inorganic material is not chemically bound to microporous polymer.

In some examples, the inorganic material can form a continuous inorganic phase within the continuous pore phase. In certain examples, the hybrid membrane can comprise an interpenetrative network of the continuous polymer phase, the continuous inorganic phase, and the continuous pore phase.

The hybrid membrane can comprise any suitable amount of the inorganic material. For example, the hybrid membrane can comprise 0.1 wt % or more of the inorganic material based on the weight of the hybrid membrane (e.g., 0.5 wt % or more, 1 wt % or more, 1.5 wt % or more, 2 wt % or more, 2.5 wt % or more, 3 wt % or more, 3.5 wt % or more, 4 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, 10 wt % or more, 11 wt % or more, 12 wt % or more, 13 wt % or more, 14 wt % or more, 15 wt % or more, 20 wt % or more, 25 wt % or more, or 30 wt % or more). In some examples, the hybrid membrane can comprise 35 wt % or less of the inorganic material based on the weight of the hybrid membrane (e.g., 30 wt % or less, 25 wt % or less, 20 wt % or less, 15 wt % or less, 14 wt % or less, 13 wt % or less, 12 wt % or less, 11 wt % or less, 10 wt % or less, 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4 wt % or less, 3.5 wt % or less, 3 wt % or less, 2.5 wt % or less, 2 wt % or less, or 1 wt % or less). The amount of inorganic material in the hybrid membrane can range from any of the minimum values described above to any of the maximum values described above. For example, the hybrid membrane can comprise from 0.1 wt % to 35 wt % of the inorganic material based on the weight of the hybrid membrane (e.g., from 0.1 wt % to 30 wt %, from 0.1 wt % to 20 wt %, from 0.1 wt % to 13 wt %, from 0.1 wt % to 10 wt %, from 1 wt % to 10 wt %, from 0.1 wt % to 8.5 wt %, or from 1 wt % to 8.5 wt %).

In some examples, the microporous polymer can comprise a polymer of intrinsic microporosity and the inorganic material can comprise a metal oxide. In some examples, the microporous polymer can comprise a polymer of intrinsic microporosity and the inorganic material can comprise a metal oxide comprising a metal selected from the group consisting of Al, Zn, and Ti. In some examples, the microporous polymer can comprise a polymer of intrinsic microporosity and the inorganic material can comprise a metal oxide selected from the group consisting of ZnO, $Al_2O_3$, and $TiO_2$.

In some examples, the microporous polymer can comprise polymer of intrinsic microporosity-1 (PIM-1) and the inorganic material can comprise a metal oxide. In some examples, the microporous polymer can comprise PIM-1 and the inorganic material can comprise a metal oxide comprising a metal selected from the group consisting of Al, Zn, and Ti. In some examples, the microporous polymer can comprise PIM-1 and the inorganic material can comprise a metal oxide selected from the group consisting of ZnO, $Al_2O_3$, and $TiO_2$.

In some examples, the inorganic material can comprise a metal oxide and the hybrid membrane can comprise from 0.1 wt % to 10 wt % or from 0.1 wt % to 8.5 wt % of the atomic scale metal oxide. In some examples, the inorganic material can comprise a metal oxide comprising a metal selected from the group consisting of Al, Zn, and Ti, and the hybrid membrane can comprise from 0.1 wt % to 10 wt % or from 0.1 wt % to 8.5 wt % of the atomic scale metal oxide. In some examples, the inorganic material can comprise a metal oxide selected from the group consisting of ZnO, $Al_2O_3$, and $TiO_2$ and the hybrid membrane can comprise from 0.1 wt % to 10 wt % or from 0.1 wt % to 8.5 wt % of the atomic scale metal oxide.

In some examples, the microporous polymer can comprise a polymer of intrinsic microporosity, the inorganic material can comprise a metal oxide, and the hybrid membrane can comprise from 0.1 wt % to 10 wt % or from 0.1 wt % to 8.5 wt % of the atomic scale metal oxide. In some examples, the microporous polymer can comprise a polymer of intrinsic microporosity, the inorganic material can comprise a metal oxide comprising a metal selected from the group consisting of Al, Zn, and Ti, and the hybrid membrane can comprise from 0.1 wt % to 10 wt % or from 0.1 wt % to 8.5 wt % of the atomic scale metal oxide. In some examples, the microporous polymer can comprise a polymer of intrinsic microporosity, the inorganic material can comprise a metal oxide selected from the group consisting of ZnO, $Al_2O_3$, and $TiO_2$, and the hybrid membrane can comprise from 0.1 wt % to 10 wt % or from 0.1 wt % to 8.5 wt % of the atomic scale metal oxide.

In some examples, the microporous polymer can comprise polymer of intrinsic microporosity-1 (PIM-1), the inorganic material can comprise a metal oxide, and the hybrid membrane can comprise from 0.1 wt % to 10 wt % or from 0.1 wt % to 8.5 wt % of the atomic scale metal oxide. In some examples, the microporous polymer can comprise polymer of intrinsic microporosity-1 (PIM-1), the inorganic material can comprise a metal oxide comprising a metal selected from the group consisting of Al, Zn, and Ti, and the hybrid membrane can comprise from 0.1 wt % to 10 wt % or from 0.1 wt % to 8.5 wt % of the atomic scale metal oxide. In some examples, the microporous polymer can comprise polymer of intrinsic microporosity-1 (PIM-1), the inorganic material can comprise a metal oxide selected from the group consisting of ZnO, $Al_2O_3$, and $TiO_2$, and the hybrid membrane can comprise from 0.1 wt % to 10 wt % or from 0.1 wt % to 8.5 wt % of the atomic scale metal oxide.

In some examples, the hybrid membrane can have a BET surface area of 200 $m^2/g$ or more (e.g., 250 $m^2/g$ or more, 300 $m^2/g$ or more, 350 $m^2/g$ or more, 400 $m^2/g$ or more, 450 $m^2/g$ or more, 500 $m^2/g$ or more, 600 $m^2/g$ or more, 700 $m^2/g$ or more, 800 $m^2/g$ or more, 900 $m^2/g$ or more, 1000 $m^2/g$ or more, 1100 $m^2/g$ or more, 1200 $m^2/g$ or more, 1300 $m^2/g$ or more, 1400 $m^2/g$ or more, 1500 $m^2/g$ or more, 1600 $m^2/g$ or more, 1700 $m^2/g$ or more, or 1800 $m^2/g$ or more). The hybrid membrane can, for example, have a BET surface area of 2000 $m^2/g$ or less (e.g., 1900 $m^2/g$ or less, 1800 $m^2/g$ or less, 1700 $m^2/g$ or less, 1600 $m^2/g$ or less, 1500 $m^2/g$ or less, 1400 $m^2/g$ or less, 1300 $m^2/g$ or less, 1200 $m^2/g$ or less, 1100 $m^2/g$ or less, 1000 $m^2/g$ or less, 900 $m^2/g$ or less, 800 $m^2/g$ or less, 700 $m^2/g$ or less, 600 $m^2/g$ or less, 500 $m^2/g$ or less, 450 $m^2/g$ or less, 400 $m^2/g$ or less, 350 $m^2/g$ or less, or 300 $m^2/g$ or less). The BET surface area of the hybrid membrane can range from any of the minimum values described above to any of the maximum values described above. For example, the hybrid membrane can have a BET surface area of from 200 $m^2/g$ to 2000 $m^2/g$ (e.g., from 200 $m^2/g$ to 1100 $m^2/g$, from 1100 $m^2/g$ to 2000 $m^2/g$, from 200 $m^2/g$ to 1400 $m^2/g$, from 1400 $m^2/g$ to 2000 $m^2/g$, from 200 $m^2/g$ to 900 $m^2/g$, from 500 $m^2/g$ to 800 $m^2/g$, or from 500 $m^2/g$ to 1200 $m^2/g$).

In some examples, the inorganic material can comprise a metal oxide and the hybrid membrane can have a BET surface area of from 500 $m^2/g$ to 800 $m^2/g$. In some examples, the inorganic material can comprise a metal oxide comprising a metal selected from the group consisting of Al, Zn, and Ti, and the hybrid membrane can have a BET surface area of from 500 $m^2/g$ to 800 $m^2/g$. In some examples, the inorganic material can comprise a metal oxide selected from the group consisting of ZnO, $Al_2O_3$, and $TiO_2$ and the hybrid membrane can have a BET surface area of from 500 $m^2/g$ to 800 $m^2/g$.

In some examples, the inorganic material can comprise a metal oxide, the hybrid membrane can comprise from 0.1 wt % to 10 wt % or from 0.1 wt % to 8.5 wt % of the atomic scale metal oxide, and the hybrid membrane can have a BET surface area of from 500 $m^2/g$ to 800 $m^2/g$. In some examples, the inorganic material can comprise a metal oxide comprising a metal selected from the group consisting of Al, Zn, and Ti; the hybrid membrane can comprise from 0.1 wt % to 10 wt % or from 0.1 wt % to 8.5 wt % of the atomic scale metal oxide; and the hybrid membrane can have a BET surface area of from 500 $m^2/g$ to 800 $m^2/g$. In some examples, the inorganic material can comprise a metal oxide selected from the group consisting of ZnO, $Al_2O_3$, and $TiO_2$; the hybrid membrane can comprise from 0.1 wt % to 10 wt % or from 0.1 wt % to 8.5 wt % of the atomic scale metal oxide; and the hybrid membrane can have a BET surface area of from 500 $m^2/g$ to 800 $m^2/g$.

In some examples, the microporous polymer can comprise a polymer of intrinsic microporosity, the inorganic material can comprise a metal oxide, and the hybrid membrane can have a BET surface area of from 500 $m^2/g$ to 800 $m^2/g$. In some examples, the microporous polymer can comprise a polymer of intrinsic microporosity, the inorganic material can comprise a metal oxide comprising a metal selected from the group consisting of Al, Zn, and Ti, and the hybrid membrane can have a BET surface area of from 500 $m^2/g$ to 800 $m^2/g$. In some examples, the microporous polymer can comprise a polymer of intrinsic microporosity, the inorganic material can comprise a metal oxide selected from the group consisting of ZnO, $Al_2O_3$, and $TiO_2$, and the hybrid membrane can have a BET surface area of from 500 $m^2/g$ to 800 $m^2/g$.

In some examples, the microporous polymer can comprise a polymer of intrinsic microporosity, the inorganic material can comprise a metal oxide, the hybrid membrane can comprise from 0.1 wt % to 10 wt % or from 0.1 wt % to 8.5 wt % of the atomic scale metal oxide, and the hybrid membrane can have a BET surface area of from 500 $m^2/g$ to 800 $m^2/g$. In some examples, the microporous polymer can comprise a polymer of intrinsic microporosity; the inorganic material can comprise a metal oxide comprising a metal selected from the group consisting of Al, Zn, and Ti; the hybrid membrane can comprise from 0.1 wt % to 10 wt % or from 0.1 wt % to 8.5 wt % of the atomic scale metal oxide; and the hybrid membrane can have a BET surface area of from 500 $m^2/g$ to 800 $m^2/g$. In some examples, the microporous polymer can comprise a polymer of intrinsic microporosity; the inorganic material can comprise a metal oxide selected from the group consisting of ZnO, $Al_2O_3$, and $TiO_2$; the hybrid membrane can comprise from 0.1 wt % to 10 wt % or from 0.1 wt % to 8.5 wt % of the atomic scale metal oxide; and the hybrid membrane can have a BET surface area of from 500 $m^2/g$ to 800 $m^2/g$.

In some examples, the microporous polymer can comprise polymer of intrinsic microporosity-1 (PIM-1), the inorganic material can comprise a metal oxide, and the hybrid membrane can have a BET surface area of from 500 $m^2/g$ to 800 $m^2/g$. In some examples, the microporous polymer can comprise PIM-1, the inorganic material can comprise a metal oxide comprising a metal selected from the group consisting of Al, Zn, and Ti, and the hybrid membrane can have a BET surface area of from 500 $m^2/g$ to 800 $m^2/g$. In some examples, the microporous polymer can comprise PIM-1, the inorganic material can comprise a metal oxide selected from the group consisting of ZnO, $Al_2O_3$, and $TiO_2$, and the hybrid membrane can have a BET surface area of from 500 $m^2/g$ to 800 $m^2/g$.

In some examples, the microporous polymer can comprise PIM-1, the inorganic material can comprise a metal oxide, the hybrid membrane can comprise from 0.1 wt % to 10 wt % or from 0.1 wt % to 8.5 wt % of the atomic scale metal oxide, and the hybrid membrane can have a BET surface area of from 500 m$^2$/g to 800 m$^2$/g. In some examples, the microporous polymer can comprise PIM-1; the inorganic material can comprise a metal oxide comprising a metal selected from the group consisting of Al, Zn, and Ti; the hybrid membrane can comprise from 0.1 wt % to 10 wt % or from 0.1 wt % to 8.5 wt % of the atomic scale metal oxide; and the hybrid membrane can have a BET surface area of from 500 m$^2$/g to 800 m$^2$/g. In some examples, the microporous polymer can comprise PIM-1; the inorganic material can comprise a metal oxide selected from the group consisting of ZnO, Al$_2$O$_3$, and TiO$_2$; the hybrid membrane can comprise from 0.1 wt % to 10 wt % or from 0.1 wt % to 8.5 wt % of the atomic scale metal oxide; and the hybrid membrane can have a BET surface area of from 500 m$^2$/g to 800 m$^2$/g.

The microporous polymer can be solution processed into a variety of configurations such that the hybrid membrane can have a variety of configurations. For example, the hybrid membrane can comprise a film, a fiber, a free-standing membrane, a spiral wound membrane, a 3D printed membrane, or a combination thereof. In some examples, the hybrid membrane can comprise a hollow fiber.

The hybrid membranes described herein can be more stable in a solvent than the corresponding microporous polymer in the absence of the atomic scale inorganic material. As used herein, "more stable" means that the hybrid membrane exhibits less swelling and/or dissolution than the corresponding microporous polymer in the absence of the atomic scale inorganic material over the same amount of time. Examples of suitable solvents include, but are not limited to ketones (e.g., acetone, methyl ethyl ketone, diethyl ketone, methyl n-propyl ketone, acetophenone, and cyclohexanone); linear, poly and cyclic ethers (e.g., diethyl ether, di-n-propyl ether, di-n-butyl ether, ethyl n-propyl ether, glyme, diglyme, tetrahydrofuran, 1,4-dioxane, 1,3-dioxolane); aromatic hydrocarbons (e.g., toluene, ethyl benzene, xylenes); alcohols (e.g., methanol, ethanol, 1-propanol, 2-propanol, isomers of butanol, isomers of pentanol, ethylene glycol, propylene glycol, glycerol); dimethylformamide (DMF); dimethoxyethane; dimethylacetamide; N-methylpyrrolidone; dimethylsulfoxide (DMSO); chloroform; dichloromethane; acetonitrile (MeCN); ethyl acetate; propylene carbonate; and combinations thereof.

For example, the hybrid membranes can be more stable in toluene, tetrahydrofuran, chloroform, dichloromethane, or a combination thereof than the corresponding microporous polymer in the absence of the atomic scale inorganic material. The hybrid membrane, for example, can have a lower toluene uptake at a P/P$^{sat}$ of 0.25 or more, a lower ethanol permeance, a lower n-heptane permeance, or a combination thereof than the corresponding microporous polymer in the absence of the atomic scale inorganic material.

In some examples, the hybrid membrane can be stable in a solvent for 1 hour or more (e.g., 2 hours or more, 3 hours or more, 4 hours or more, 6 hours or more, 12 hours or more, 1 day or more, 2 days or more, 3 days or more, 4 days or more, 5 days or more, 6 days or more, 1 week or more, 2 weeks or more, 3 weeks or more, 1 month or more, 2 months or more, 3 months or more, 6 months or more, 9 months or more, 1 year or more, 2 years or more, 3 years or more, 4 years or more, or 5 years or more). As used herein, "stable" means that 10 wt % or less of the hybrid membrane dissolves in the solvent over the time frame. Examples of suitable solvents include, but are not limited to ketones (e.g., acetone, methyl ethyl ketone, diethyl ketone, methyl n-propyl ketone, acetophenone, and cyclohexanone); linear, poly and cyclic ethers (e.g., diethyl ether, di-n-propyl ether, di-n-butyl ether, ethyl n-propyl ether, glyme, diglyme, tetrahydrofuran, 1,4-dioxane, 1,3-dioxolane); aromatic hydrocarbons (e.g., toluene, ethyl benzene, xylenes); alcohols (e.g., methanol, ethanol, 1-propanol, 2-propanol, isomers of butanol, isomers of pentanol, ethylene glycol, propylene glycol, glycerol); dimethylformamide (DMF); dimethoxyethane; dimethylacetamide; N-methylpyrrolidone; dimethylsulfoxide (DMSO); chloroform; dichloromethane; acetonitrile (MeCN); ethyl acetate; propylene carbonate; and combinations thereof.

In some examples, the hybrid membrane can be stable in tetrahydrofuran, chloroform, dichloromethane, or a combination thereof for 1 hour or more (e.g., 2 hours or more, 3 hours or more, 4 hours or more, 6 hours or more, 12 hours or more, 1 day or more, 2 days or more, 3 days or more, 4 days or more, 5 days or more, 6 days or more, 1 week or more, 2 weeks or more, 3 weeks or more, 1 month or more, 2 months or more, 3 months or more, 6 months or more, 9 months or more, 1 year or more, 2 years or more, 3 years or more, 4 years or more, or 5 years or more).

Methods of Making

Also described herein are methods of making any of the hybrid membranes described herein. For example, also described herein are methods of making any of the hybrid membranes described herein, the method comprising infiltrating the microporous polymer with the inorganic material using vapor phase infiltration. Vapor phase infiltration is described, for example, in US Patent Application No. 2018/0127870, which is hereby incorporated by reference herein in its entirety for its teaching on VPI.

In some examples, the vapor phase infiltration can comprise exposing the microporous polymer to a precursor, thereby forming an impregnated membrane. The precursor can, for example, comprise a metal-organic precursor, a metalloid-organic precursor, or a combination thereof. The precursor can, for example, comprise a metal alkyl compound, a metalloid alkyl compound, a metal halide, a metalloid halide, a metal tetrakisalkylamido compound, a metalloid tetrakisalkylamido compound, a metal cyclopentadienyl compound, a metalloid cyclopentadienyl compound, a metal ketonate, a metalloid ketonate, other similar metal-organic and/or metalloid-organic species with sufficient vapor pressure to be delivered in the gaseous phase, and combinations thereof. The vapor phase infiltration can, for example, further comprise exposing the impregnated membrane to a reactant, thereby forming the inorganic material. The reactant can, for example, comprise an oxidant (e.g., oxygen, ozone, hydrogen peroxide, water, etc.), a nitrogen containing compound (e.g., ammonia, hydrazine, etc.), a carbonaceous compound (e.g., methane), or a combination thereof.

In certain examples, the vapor phase infiltration can comprise exposing the microporous polymer to a metal-organic precursor comprising trimethylaluminum (TMA), diethylzinc (DEZ), titanium tetrachloride (TiCl$_4$), titanium isopropoxide, or a combination thereof, thereby forming an impregnated membrane. The vapor phase infiltration can, for example, further comprise exposing the impregnated membrane to an oxidant comprising water, oxygen, or a combination thereof, thereby forming the inorganic material which comprises a metal oxide.

The vapor phase infiltration can, in some examples, be conducted at a temperature of 0° C. or more (e.g., 10° C. or more, 20° C. or more, 30° C. or more, 40° C. or more, 50° C. or more, 60° C. or more, 70° C. or more, 80° C. or more, 90° C. or more, 100° C. or more, 110° C. or more, 120° C. or more, 130° C. or more, 140° C. or more, 150° C. or more, 175° C. or more, 200° C. or more, 225° C. or more, 250° C. or more, 300° C. or more, 350° C. or more, or 400° C. or more). In some examples, the vapor phase infiltration can be conducted at a temperature of 450° C. or less (e.g., 400° C. or less, 350° C. or less, 300° C. or less, 250° C. or less, 225° C. or less, 200° C. or less, 175° C. or less, 150° C. or less, 140° C. or less, 130° C. or less, 120° C. or less, 110° C. or less, 100° C. or less, 90° C. or less, 80° C. or less, 70° C. or less, 60° C. or less, 50° C. or less, 40° C. or less, 30° C. or less, or 20° C. or less). The temperature at which the vapor phase infiltration can be conducted can range from any of the minimum values described above to any of the maximum values described above. For example, the vapor phase infiltration can be conducted at a temperature of from 0° C. to 450° C. (e.g., from 70° C. to 250° C., from 80° C. to 120° C., from 90° C. to 110° C., from 85° C. to 95° C., or from 105° C. to 115° C.). In certain examples, the vapor phase infiltration can be conducted at a temperature of 90° C. or 110° C.

In some examples, the methods can comprise performing one or more cycles of vapor phase infiltration to make the hybrid membrane (e.g., 2 or more, 3 or more, 4 or more, 5 or more, 6 or more, 7 or more, 8 or more, 9 or more, or 10 or more).

The methods can, in some examples, further comprise pre-treating the microporous polymer prior to performing the vapor phase infiltration. For example, pre-treating the microporous polymer can comprise contacting the microporous polymer with an alcohol (e.g., methanol, ethanol, 1-propanol, 2-propanol, isomers of butanol, isomers of pentanol, ethylene glycol, propylene glycol, glycerol); dimethylfuran; n-methylpyrrolidone; or a combination thereof. In some examples, pre-treating the microporous polymer can comprise contacting the microporous polymer with methanol.

In some examples, the methods can be performed in situ, such that, for example, the hybrid membrane can be formed in situ in a membrane module.

Methods of Use

Also disclosed herein are methods of use of the hybrid membranes described herein. For example, the hybrid membranes can be used in various articles of manufacture, such as, for example, gas storage devices and/or sensors. Such articles of manufacture can be fabricated by methods known in the art.

In some examples, the hybrid membranes described herein can be used as a sorbent, as a catalyst support, or a combination thereof.

In some examples, the hybrid membranes described herein can be used in a membrane separation. The hybrid membrane can, for example, exhibit better separation performance in the membrane separation than the corresponding microporous polymer in the absence of the atomic scale inorganic material. In some examples, the hybrid membrane can exhibit a higher rejection of a solute (e.g., a sorptive solute) in a membrane separation than the corresponding microporous polymer in the absence of the atomic scale inorganic material. The hybrid membrane can, for example, reject more dye in a dye separation than the corresponding microporous polymer in the absence of the atomic scale inorganic material.

The hybrid membrane can, for example, exhibit a better size-based separation performance in plasticizing solvents than the corresponding microporous polymer in the absence of the atomic scale inorganic material. For example, the hybrid membrane can exhibit a lower molecular weight cutoff for a size-based separation than the corresponding microporous polymer in the absence of the atomic scale inorganic material.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Modern chemical manufacturing depends on efficient chemical separations. Today, most separations are achieved with energy-intensive thermal approaches based on phase changes (e.g., distillation), which account for 10-15% of global energy usage (Sholl et al. *Nature* 2016, 532, 435-437). In contrast, membrane separations—which differentiate molecules based on variations in molecular size, shape, and physicochemical interaction parameters—require minimal energy input. For instance, membrane-based desalination uses 90% less energy than the most optimized thermally driven processes (Koros et al. *AIChE J.* 2012, 58, 2624-2633).

Most current commercial membrane separation technologies are deployed for gaseous chemicals or aqueous media (e.g., brine). However, membrane usage in organic solvent separation (e.g., xylene separation, organic solvent dehydration, product separation of synthesis solution, etc.) is becoming more prevalent in the modern chemical industry due to its potential energy savings. For instance, the separation of benzene derivatives requires approximately 430 TWh of energy each year (Sholl et al. *Nature* 2016, 532, 435-437); membrane processes such as organic solvent nanofiltration (OSN) and organic solvent reverse osmosis (OSRO) can potentially drive this energy cost down by an order of magnitude (Koh et al. *Science* 2018, 353, 804-807). For successful integration into industrial processing, organic solvent nanofiltration processes require membranes that retain their mechanical integrity and microstructure when operating in aggressive organic solvents (Marchetti et al. *Chem. Rev.* 2014, 114, 10735-10806). While inorganic membranes, like zeolites, are inherently stable in organic solvents, they are costly and challenging to scale up in a defect-free manner (Kosinov et al. *J. Memb. Sci.* 2016, 499, 65-79). Polymer membranes can be mass-produced defect-free but lack the requisite levels of organic solvent stability.

One polymer membrane material of interest for organic solvent nanofiltration is polymer of intrinsic microporosity 1 (PIM-1). At ambient conditions, PIM-1 is a rigid, glassy polymer with high levels of microporosity that is solution-processable, but, like other polymer membranes, it has limited stability and selectivity when exposed to plasticizing solvents or highly sorptive solutes (Zhang et al. *Macromol. Rapid Commun.* 2018, 39, 1800274; Budd et al. *Adv. Mater.* 2004, 16, 456-459; Cook et al. *J. Memb. Sci.* 2018, 558, 52-63; Tsarkov et al. *J. Memb. Sci.* 2012, 423-424, 65-72). Several post-fabrication techniques have been developed to enhance the solvent stability of polymer membranes like PIM-1, including crosslinking to create interconnected polymer networks and thermal pyrolysis to create carbon molecular sieves (Koh et al. *Science* 2018, 353, 804-807; Marchetti et al. *Chem. Rev.* 2014, 114, 10735-10806; Koh et al. *Nat. Nanotechnol.* 2015, 10, 385-386; Ma et al. *J. Memb. Sci.* 2018, 564, 404-414). While these techniques show promise towards creating solvent-stable scalable membranes, both lead to dramatic changes in the membrane's microscopic structure and higher probability of defect formation. These post-fabrication techniques also require large amounts of chemicals or additional equipment that generate added costs.

Vapor phase infiltration (VPI) is a gas-phase, solvent-free process that has emerged from the atomic layer deposition (ALD) community to load polymer free volume with inorganics, frequently metal oxides (Leng et al. *Mater. Horizons* 2017, 4, 747-771; Azpitarte et al. *MRS Commun.* 2018, 8, 727-741; Subramanian et al. *JOM* 2018 doi:10.1007/s11837-018-3141-4; Ingram et al. *JOM* 2018 doi:10.1007/s11837-018-3157-9). VPI has been shown to strengthen spider silk and provide UV protection to Kevlar fibers (Lee et al. *Science* 2009, 324, 488-92; Azpitarte et al. *Chem. Mater.* 2017, 29, 10068-10074). Different from crosslinking or pyrolysis, VPI leaves the polymer microstructure and macroscale form factor unchanged (Obuchovsky et al. *Chem. Mater.* 2016, 28, 2668-2676; Padbury et al. *J. Phys. Chem. C* 2014, 118, 18805-18813). A further advantage of VPI is the ease of large-scale application. Whereas crosslinking requires processing of new solvents and chemicals and pyrolysis requires high temperatures (>400° C.), VPI can be accomplished within the standard membrane modules with minimal investment in additional equipment. The mild reaction environment (rough vacuum and 90° C.) can be supplied by general vacuum pumps and heating media.

Herein, vapor phase infiltration (VPI) was used to synthesize hybrid membranes by infusing polymer of intrinsic microporosity 1 (PIM-1) with inorganic constituents. These hybrid membranes are fundamentally distinct from mixed matrix membranes because the organic and inorganic species form complex networks that interpenetrate at the atomic-scale. Spectroscopy, porosimetry, and microscopy experiments suggest that the metal oxide intercalates throughout the microporous polymer network, thus stabilizing these materials in aggressive solvent environments while still retaining the polymer's macroscale form factor and microporous internal structure. The atomic-scale metal oxide networks within these hybrid membranes protect PIM-1 from swelling or dissolving in organic solvents (e.g., plasticizing solvents) including: tetrahydrofuran, dichloromethane, and chloroform. This stability translates to significantly improved separation performance in such solvents. The hybrid membranes efficiently reject low molecular weight solutes in solvent environments that otherwise result in complete failure of "organic-only" uncross-linked precursor membranes.

Polymer of intrinsic microporosity 1 (PIM-1) was synthesized via room-temperature condensation of tetrafluoroterephthalonitrile (TFTPN, Alfa Aesar) and 5,5',6,6'-Tetrahydroxy-3,3,3',3'-tetramethyl-1,1'-spirobisindane (TTSBI, Alfa Aesar) in anhydrous dimethylformamide (DMF, Alfa Aesar) catalyzed by $K_2CO_3$ (Alfa Aesar) fine powders for 72 hours (Jue et al. *Macromolecules* 2015, 48, 5780-5790; Zhang et al. *Macromol. Rapid Commun.* 2018, 39, 1800274). Prior to synthesis, TTSBI and TFTPN were purified via vacuum sublimation and recrystallization respectively (Jue et al. *Macromolecules* 2015, 48, 5780-5790). Monomers and oligomers were removed by post-synthesis washing using DMF and methanol. The purified PIM-1 ($Mn=50,166$; $Mw/Mn=1.65$) was then stored in sealed jars.

Unless declared, all organic solvents used herein were generic of ACS grade purchased from Sigma-Aldrich or Alfa Aesar without further treatment. Styrene dimers and 5 polystyrene oligomers were purchased from Agilent. Torlon™ 4000 LV was supplied by Solvay. p-Xylylenediamine was purchased from Sigma-Aldrich.

For flat PIM-1 membrane casting, the dry PIM-1 powder was first dissolved in anhydrous chloroform with a mass ratio of 1:200. After complete dissolution, the PIM-1 solution was filtered through a PTFE filter with 0.45 µm pores. The clear yellow PIM-1 solution was then transferred into a nitrogen glove bag that had been saturated with chloroform. The PIM-1 solution was then poured into a PTFE petri dish. After 48 hours of slow evaporation, the flat PIM-1 membrane was transferred into a vacuum oven (990 mbar, 80° C.) to dry thoroughly. The thickness of the flat PIM-1 membranes was controlled by varying the amount of PIM-1 solution poured into PTFE petri dishes. These flat PIM-1 membranes were then used to study VPI infiltration depth, contact angle, and transmission FTIR.

PIM-1 hollow fiber membranes were fabricated via dry-wet spinning as described by Jue et al. (Jue et al. *J. Memb. Sci.* 2017, 530, 33-41). As a result of phase inversion, PIM-1 hollow fiber membranes exhibit hierarchical porosity, which minimizes the characteristic diffusion length of VPI precursors and results in thorough metal oxide infiltration.

Vapor phase infiltration was carried out in a 1 $ft^3$ (0.028 $m^3$) cubic hot-wall reactor. The reactor size (1 $ft^3$) allows for large-scale processing. The reactor was temperature-controlled using PID controllers. Valves were actuated pneumatically using compressed air and a custom control box. Nitrogen supply was 99.999% purity and was supplied at 250 sccm by a mass flow controller. Precursor bottles and water attachment served as reservoirs for reactive species. A trap was used prior to a rotary vane roughing pump to reduce the presence of reactive species and byproducts in the pump oil.

Prior to infiltration, PIM-1 materials (with the exception of the thin film composites) were soaked in methanol for two hours and dried in a fume hood for 30 minutes. The VPI chamber was operated at 90° C. and prior to infiltration was purged with 250 sccm ultrahigh purity nitrogen (Airgas, 99.999%) for between 5 and 15 hours (depending upon mass of PIM-1 in the chamber) to remove excess methanol and water (FIG. 1). Following purging, the chamber was pumped down to baseline (~90 mTorr) (FIG. 1). Into the evacuated chamber, metal-organic precursors from Strem Chemicals (trimethylaluminum [98%], diethylzinc [95%], or titanium tetrachloride [97%]) were dosed from room temperature for 1 second (~300 mTorr) unless otherwise noted (FIG. 1). The PIM-1 material within the chamber was exposed to the static precursor environment for varying amounts of time (5 hours, unless otherwise noted) to allow the precursor to sorb and diffuse (FIG. 1). After the prescribed time, the chamber was purged and evacuated (FIG. 1). Room temperature deionized water vapor (e.g., an oxidant) was then dosed for 5 seconds (~1.5 Torr) and exposed to the PIM-1 material for a time equivalent to precursor exposure to allow the water to sorb and diffuse (FIG. 1). The chamber was purged and evacuated before repeating the cycle (two total cycles were used unless otherwise noted) (FIG. 1). Materials were removed promptly once the process was completed. VPI recipes were automated via custom Labview control software (Piercy et al. *Mater. Process. Meas. Phenom.* 2015, 33, 043201).

Figure 2:
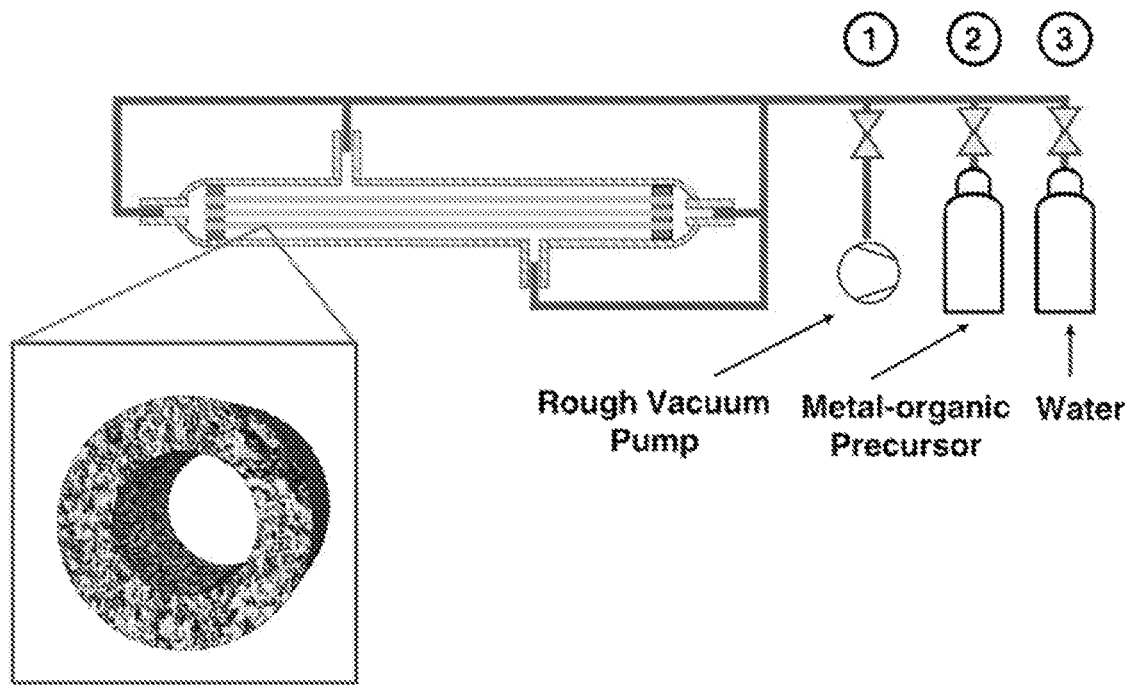
FIG. 2 is an illustration of conducting VPI in a hollow fiber membrane module.

FIG. 2 is an illustration of conducting VPI in a hollow fiber membrane module. All ports of a typical membrane module were temporally connected to a rough vacuum pump, a metal-organic precursor container, and a water container. The temperature of all tubes and modules was maintained by heating pads or a water bath. By switching the valves, membranes in the module can be evacuated (open valve 1 but close valve 2 and 3), infiltrated with metal-organic precursors (open valve 2 but close valve 1 and 3) or infiltrated with water vapor (open valve 3 but close valve 1 and 2). After infiltration, pumps and reactant containers can be disassembled. The module containing hybrid membranes can then be integrated into separation processes.

Figure 3:
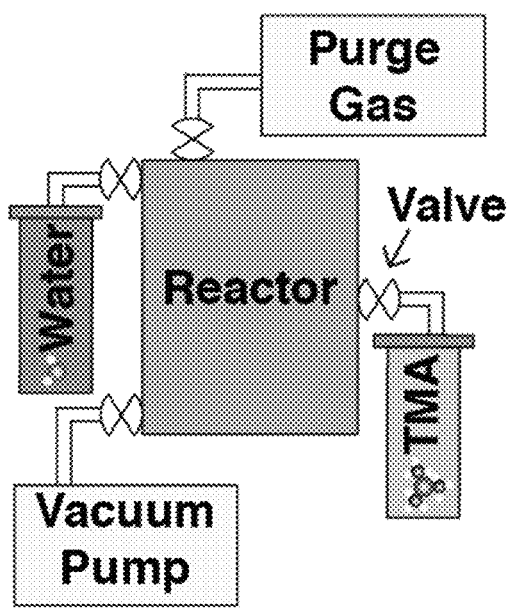
FIG. 3 is a schematic diagram of a vapor phase infiltration (VPI) reactor. Precursors were dosed into a static vapor environment. The chamber was pumped and purged with nitrogen between the precursor and co-reactant doses.
Figure 4:
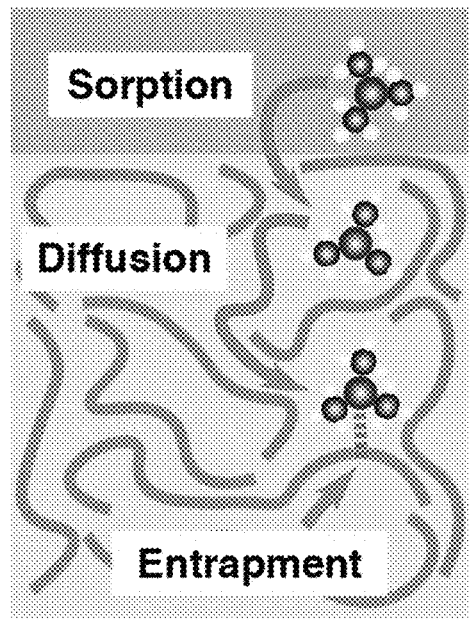
FIG. 4 is a schematic depiction of VPI process: precursor sorption, diffusion, and entrapment (coordination or chemical reaction).
Figure 5:
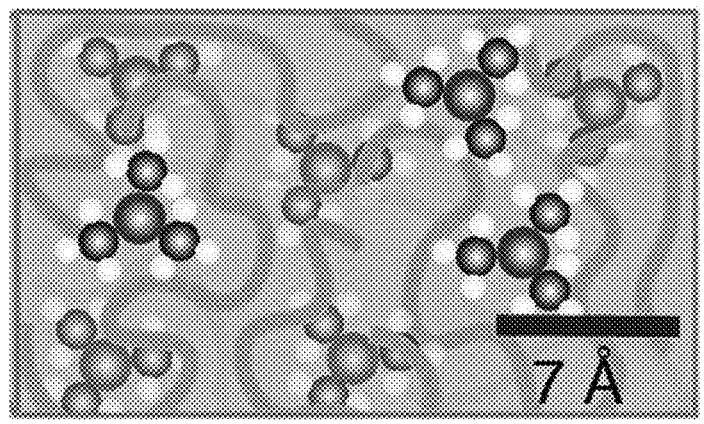
FIG. 5 is a schematic depiction of metal-organic precursors sorbing into the PIM-1 microporosity and becoming trapped.
Figure 6:
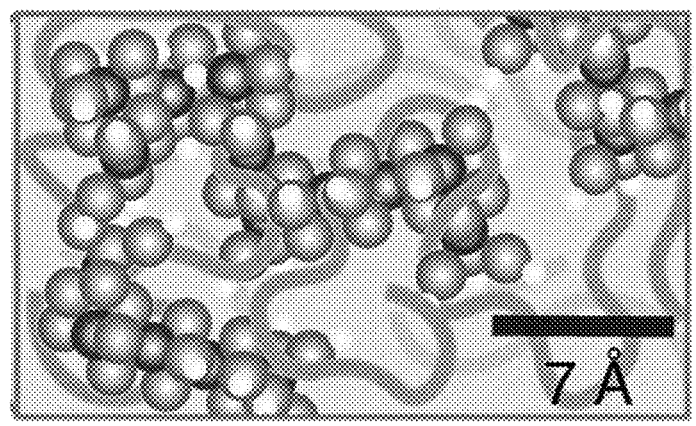
FIG. 6 is a schematic depiction of water vapor sorbing into the structure and reacting with the metal-organic to form an interpenetrating metal oxide network. Infiltration of precursors and co-reactants are often cycled twice to increase the inorganic loading.

FIG. 3, FIG. 4, FIG. 5, and FIG. 6 illustrate how the VPI process creates metal oxide/PIM-1 hybrid membranes. Pristine PIM-1 membranes (e.g., thin composite films, hollow fiber membranes, or free-standing membranes) were fabricated and then placed in a customized isothermal reaction chamber maintained at 90° C. (FIG. 3). After evacuation to rough vacuum (60 mTorr), the membranes were sequentially exposed to metal-organic precursors (trimethylaluminum [TMA], diethylzinc [DEZ], or titanium tetrachloride [$TiCl_4$]) and water vapor. During exposure, precursor molecules sorbed and diffused into the PIM-1 membranes (FIG. 4). After a purge-pump cycle, the membrane, which is now saturated with metal-organic precursors, was exposed to water vapor. The metal-organic and water reacted within the membrane creating an interpenetrating metal oxide network (FIG. 5 and FIG. 6).

Figure 7:
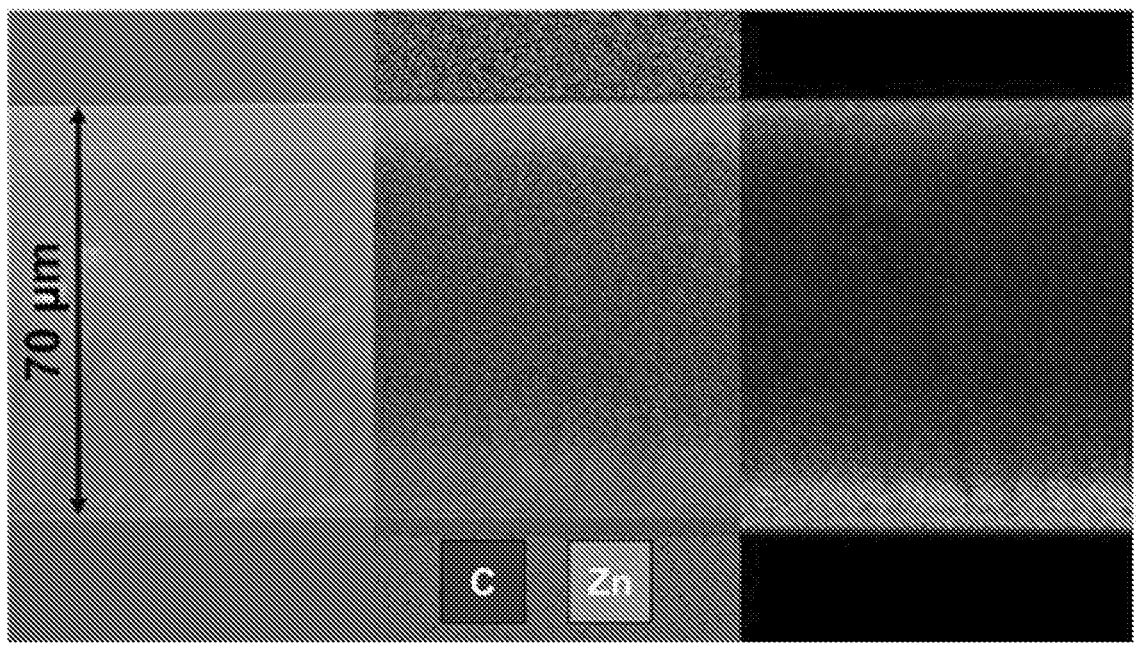
FIG. 7 is an EDX elemental map of a defect-free PIM-1 membrane of 70 μm thickness after 10 cycles of infiltration of $ZnO_x$ with a hold time of 2 hours at 90° C.
Figure 8:
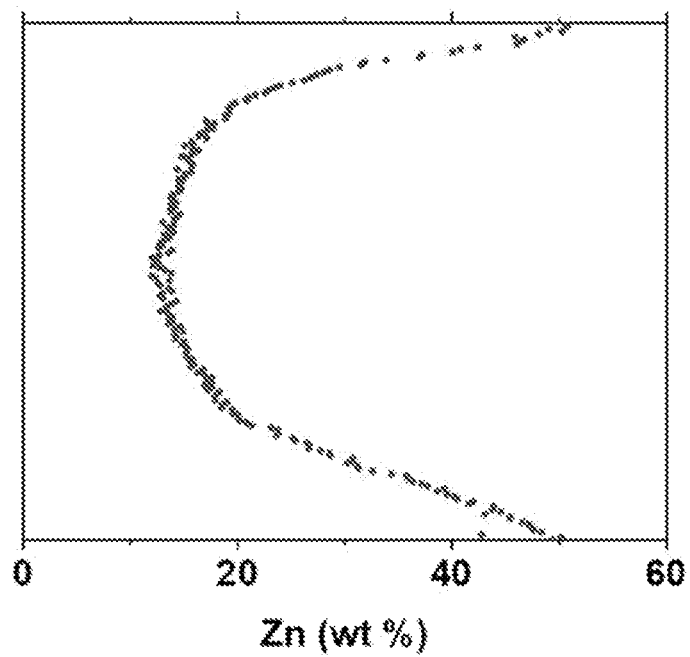
FIG. 8 is the zinc loading profile across the membrane shown in FIG. 7.
Figure 9:
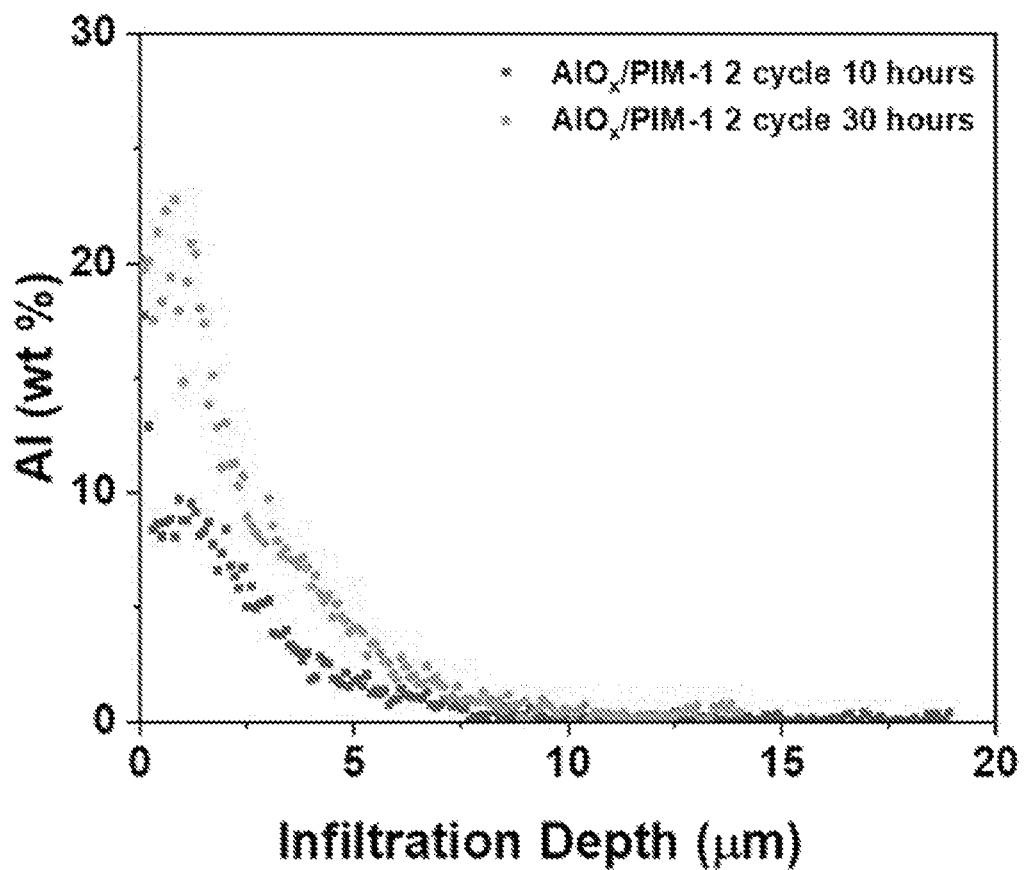
FIG. 9 is a plot of the infiltration depth of aluminum into thick PIM-1 membranes as a function of hold time.

By varying the exposure times and the number of cycles in VPI, the amount and depth of inorganic infiltration can be engineered (FIG. 7-FIG. 9). The loading of metal atoms reaches the maximum on the edges of the membrane and decreases into the center of the membrane due to diffusion limitations (FIG. 7 and FIG. 8). Longer hold time can increase the infiltration depth (FIG. 9). Metal oxide loading amounts and depths also depend on membrane morphology. Dense membranes with low free volume have large characteristic mass transfer lengths and require long diffusion times to achieve full infiltration. Since it is challenging to fully infiltrate dense thick PIM-1 membranes in reasonable timeframes, membranes with a thin PIM-1 selective layer (e.g., thin film composite [TFC] and hollow fiber membranes) are used in the following experiments to ensure thorough infiltration of the metal oxide.

Cross-section Scanning Electron Microscopy (SEM) images of the membranes were obtained with a Hitachi 8230 FE-SEM. Membranes were soaked in n-hexane for 10 minutes and fractured in liquid nitrogen to get clean cross sections. Crystallized hexane prevents the collapse of macropores during fracturing, and the low surface tension of hexane avoids the collapse of macropores and mesopores during evaporation. Fractured membranes were also sputtered with gold to reduce electron charging. Energy-dispersive X-ray (EDX) spectroscopy was used to obtain the element mapping of the membranes.

Transmission Electron Microscopy (TEM) was used to determine the homogeneity of the hybrid material. TEM grids with carbon lace were dip-coated in a 0.5 wt % PIM-1 chloroform solution and dried in a glove bag filled with nitrogen. After 24-hour slow evaporation, the PIM-1 coated grids were further dried in vacuum at 100° C. for 24 hours. The PIM-1 coated grids were then thoroughly infiltrated with $AlO_x$, $ZnO_x$, and $TiO_x$ (90° C., two cycles of VPI, 5-hour hold time). The microstructure of the hybrid membranes on these grids was then analyzed with a Hitachi HT7700 TEM.

Figure 10:
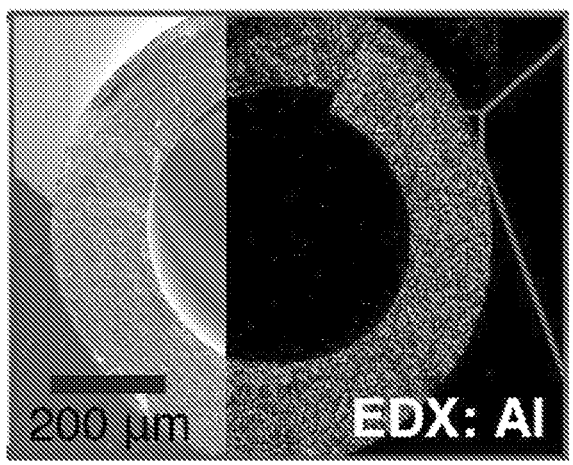
FIG. 10 is a SEM image with an EDX map of a section of the PIM-1 membrane after infiltration with trimethylaluminum and water (2 cycles). White pixels in EDX map show aluminum distribution throughout the hybrid membrane.
Figure 11:
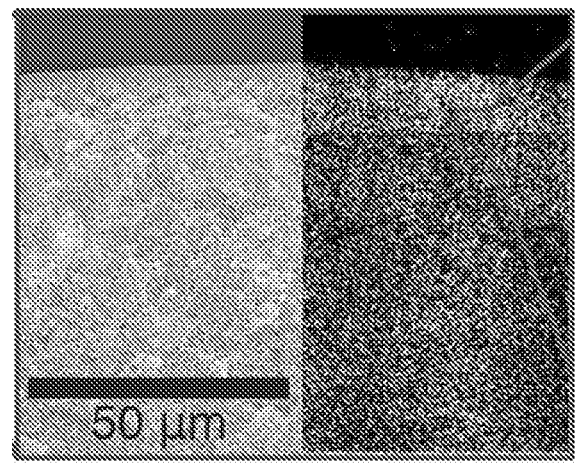
FIG. 11 is a higher magnification SEM image with an EDX map of the section of the PIM-1 membrane after infiltration with trimethylaluminum and water (2 cycles) indicated by the box in FIG. 10. White pixels in EDX map show aluminum distribution throughout the hybrid membrane.
Figure 12:
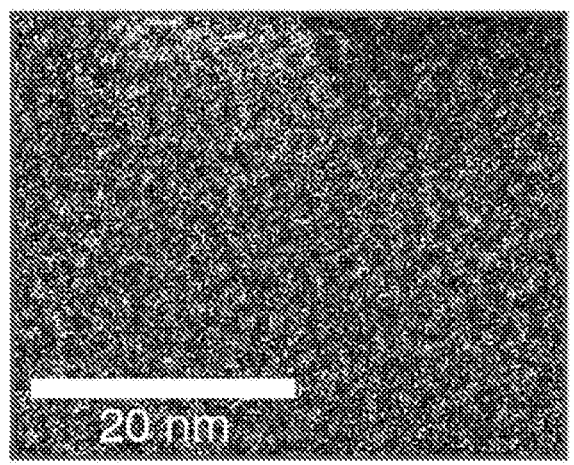
FIG. 12 is a TEM image of the section of the PIM-1 membrane after infiltration with trimethylaluminum and water (2 cycles) indicated by the box in FIG. 11.

The microstructure and chemical composition of pristine PIM-1 membranes and PIM-1 membranes infiltrated with aluminum oxide networks ($AlO_x$/PIM-1) were analyzed photographically and using electron microscopy. Infiltrated, hybrid membranes showed negligible change in macrostructure. At the micro-scale, the inorganic constituent was homogeneously dispersed throughout the entire polymer (FIG. 10-FIG. 11). Even at the nano- to atomic-scale, the inorganic constituent appeared to be homogeneously distributed: no metal oxide nanoparticles were observed in TEM (FIG. 12), and no metal oxide crystallinity is detected with XRD (FIG. 13).

X-ray powder diffraction was used to analyze the crystallinity of the interpenetrating networks of metal oxide and PIM-1. PIM-1 hollow fiber membranes thoroughly infiltrated with $AlO_x$, $ZnO_x$ and $TiO_x$ (90° C., two cycles of VPI, 5-hour hold time) were ground into fine powders and then analyzed by Panalytical XPert PRO Alpha-1 XRD (Malvern Panalytical).

Figure 13:
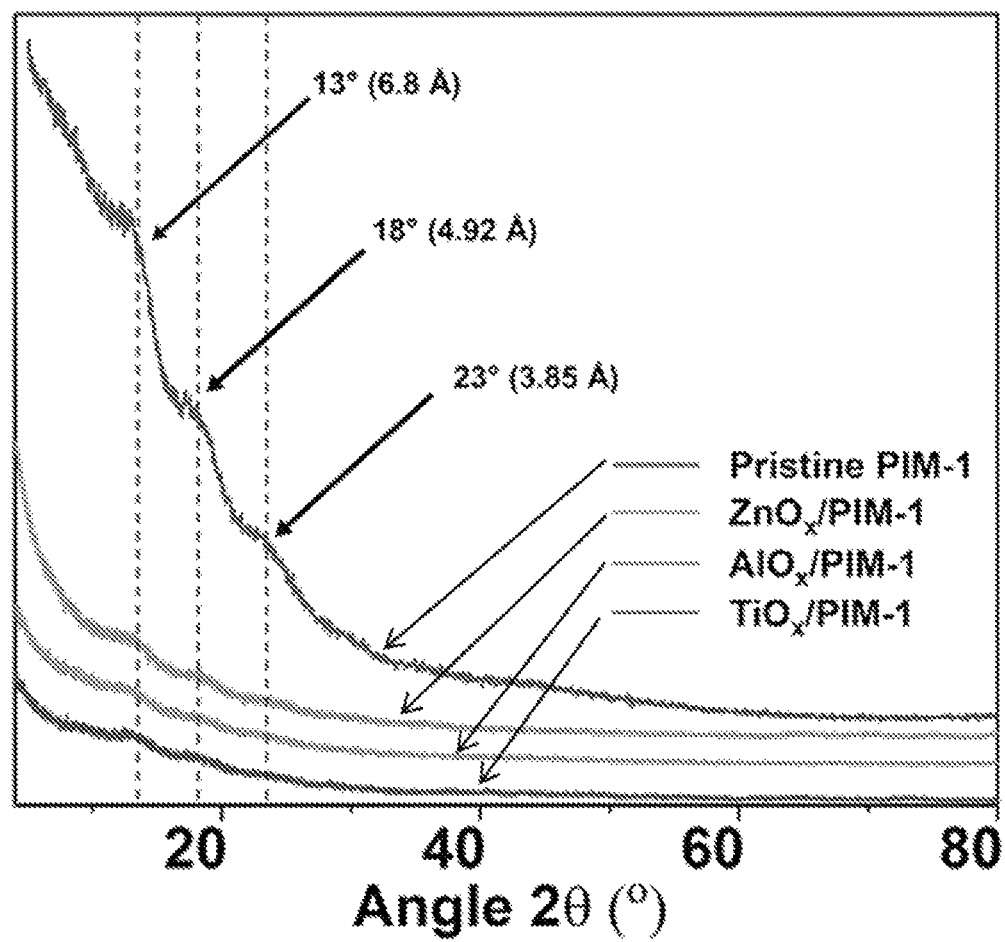
FIG. 13 is the XRD patterns of pristine PIM-1, $ZnO_x$/PIM-1, $TiO_x$/PIM-1, and $AlO_x$/PIM-1.

XRD patterns of pristine PIM-1 exhibited the characteristic peaks of PIM-1 at 13°, 18°, and 23° indicate the interlayer spacing of 6.8 Å, 4.92 Å and 3.85 Å (FIG. 13). These peaks were also observed at the identical position in the XRD of $ZnO_x$/PIM-1, $TiO_x$/PIM-1, and $AlO_x$/PIM-1, which suggests that the infiltrated metal oxides do not interrupt the microporous structures of PIM-1 (FIG. 13). None of the characteristic peaks corresponding to the crystal structures of metal oxides were found, which indicates that infiltrated metal oxides form amorphous structures due to confinement within PIM-1 (FIG. 13). These results revealed that the PIM-1 membranes accommodated homogeneous inorganic loading without significant changes in microstructure.

X-ray Photoelectron Spectroscopy (XPS) was used to determine the existence and chemical bonding states of hybrid materials. PIM-1 hollow fiber membranes thoroughly infiltrated with $AlO_x$, $ZnO_x$ and $TiO_x$ (90° C., two cycles of VPI, 5-hour hold time) were ground into fine powders and analyzed with a Thermo K-Alpha XPS (Thermo Fisher Scientific). Since metal oxide/PIM-1 hybrids are nonconductive, electrons aggregated on the sample surface result in significant peak shifts. Peak position was calibrated via an internal standard method. For each hybrid material, two pools of sample powders were prepared, one of which was mixed with silver nanoparticles. $C^{1s}$ peak position was firstly calibrated according to the $Ag^{3d}$ peaks detected in the sample mixed with silver nanoparticles. The other peaks in the sample without additives was then calibrated according to the $C^{1s}$ peak shifts. Metal oxides were also coated onto silicon wafers via atomic layer deposition and analyzed by XPS. $O^{1s}$ peak positions of metal oxides were used as a comparison.

Solid-state NMR was used to identify chemical states of carbon, hydrogen and aluminum atoms in the hybrid materials. PIM-1 hollow fiber membranes thoroughly infiltrated with $AlO_x$, $ZnO_x$ and $TiO_x$ (90° C., two cycles of VPI, 5-hour hold time) were ground into fine powders and packed into the zirconium NMR rotor. Solid-state NMR was then carried out via Bruker Avance III400.

Fourier-transform infrared spectroscopy (FTIR) was used to characterize changes in the vibrational spectrum of PIM-1's functional groups after VPI. 10-μm flat PIM-1 films were thoroughly infiltrated with $AlO_x$, $ZnO_x$ and $TiO_x$ (90° C., two cycles of VPI, 5-hour holds) and characterized with a Thermo Scientific iS50 FT-IR Spectrometer (Thermo Fisher Scientific) using transmission mode.

Figure 14:
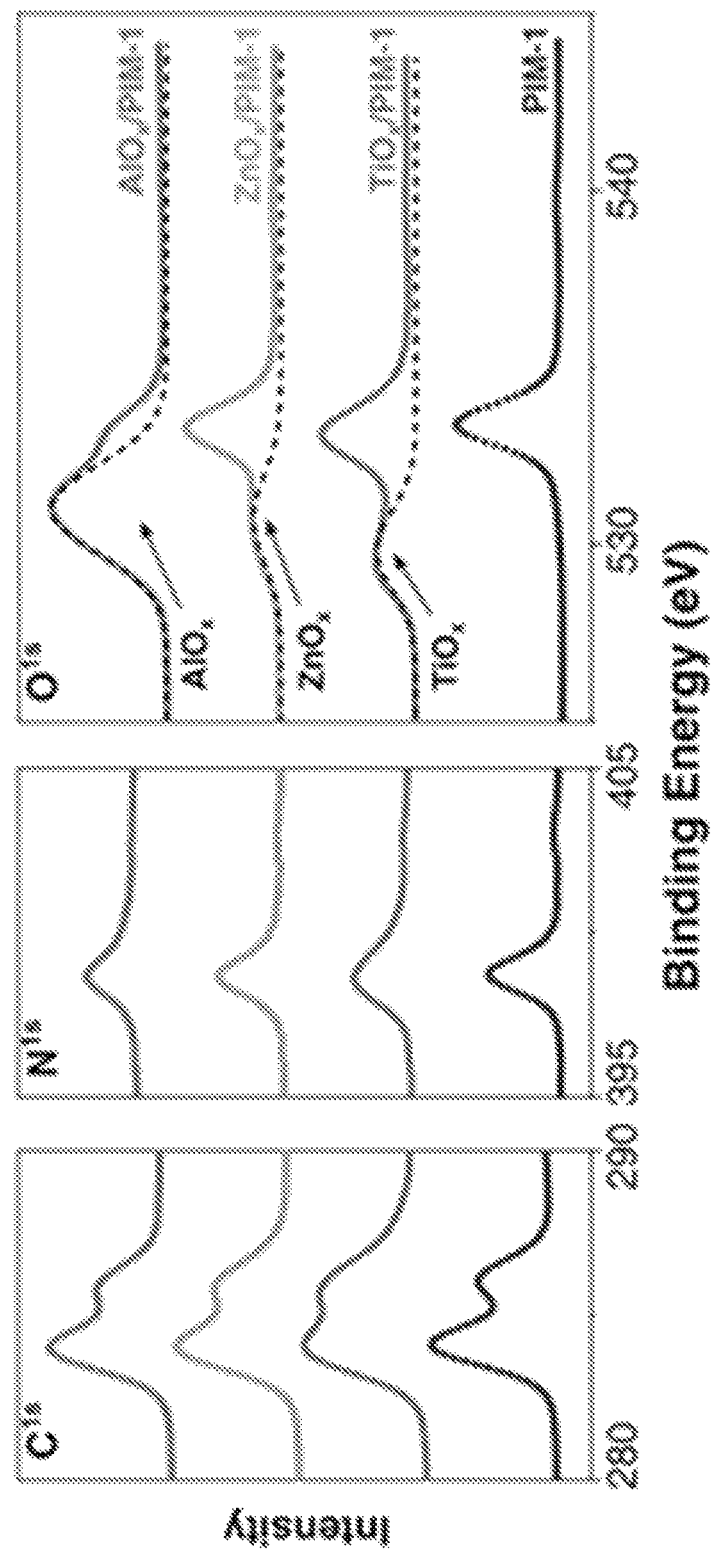
FIG. 14 is the $C^{1s}$, $N^{1s}$, and $O^{1s}$ XPS spectra for pristine PIM-1 and PIM-1 infiltrated with $AlO_x$, $ZnO_x$, and $TiO_x$. * Broad hydroxyl peaks are induced by absorbed water.
Figure 15:
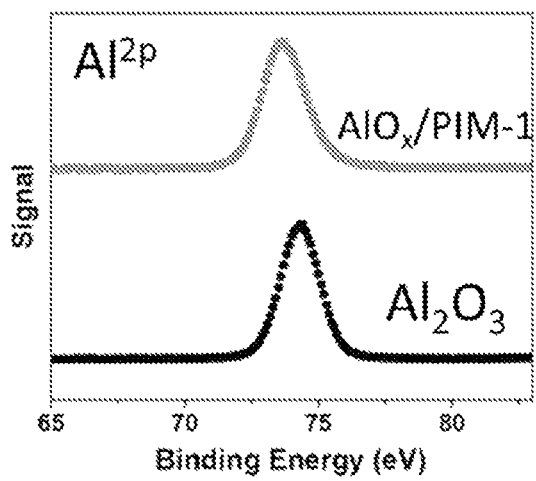
FIG. 15 is the $Al^{2p}$ XPS spectra of $Al_2O_3$ and $AlO_x$/PIM-1.
Figure 16:
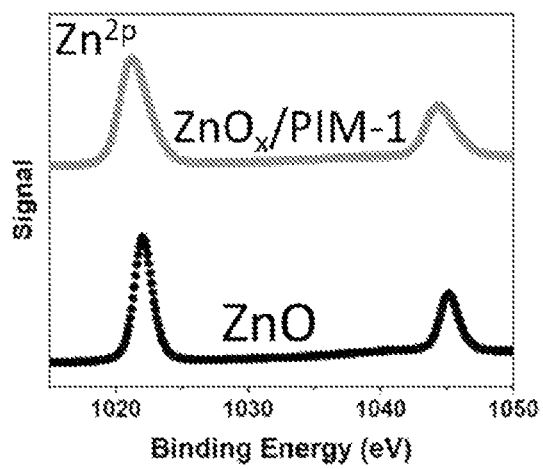
FIG. 16 is the $Zn^{2p}$ XPS spectra of ZnO and $ZnO_x$/PIM-1.
Figure 17:
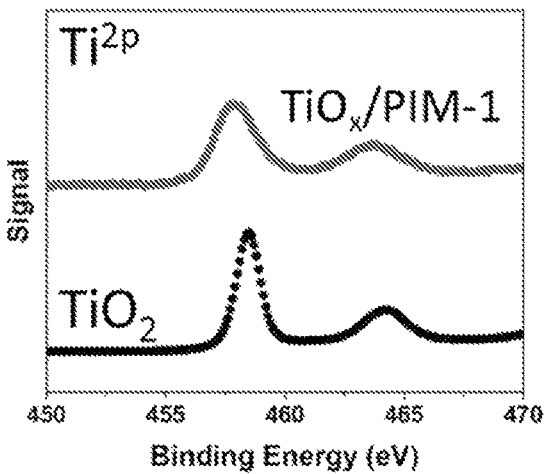
FIG. 17 is the $Ti^{2p}$ XPS spectra of $TiO_2$ and $TiO_x$/PIM-1.
Figure 18:
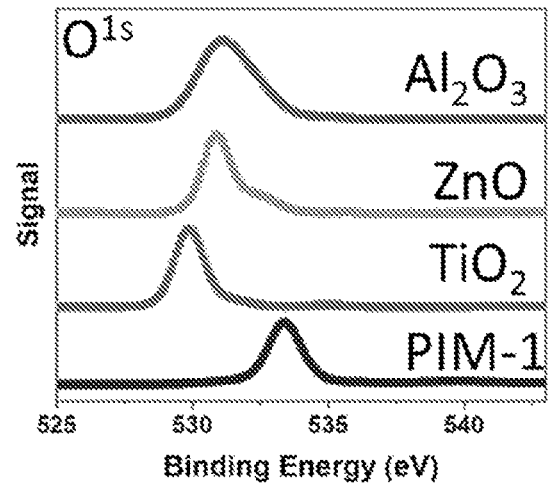
FIG. 18 is the $O^{1s}$ XPS spectra of $Al_2O_3$, ZnO, $TiO_2$ and pristine PIM-1.
Figure 19:
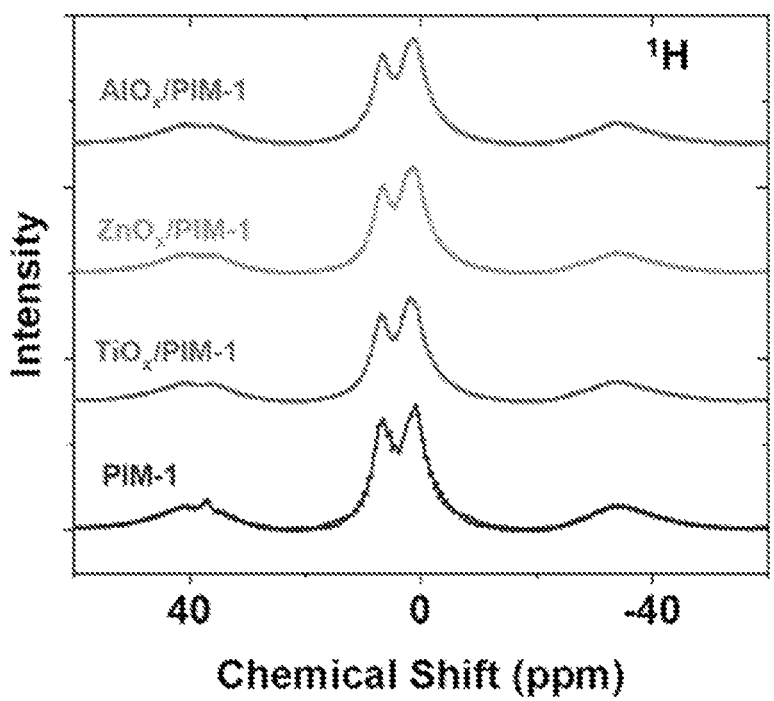
FIG. 19 is the solid-state 1H NMR spectra of pristine PIM-1, $ZnO_x$/PIM-1, $TiO_x$/PIM-1, and $AlO_x$/PIM-1. All these samples exhibit identical $^{13}C$ and $^1H$ signals, which indicates the identical chemical environments of carbon and hydrogen atoms. PIM-1 powders used for NMR were obtained via grinding PIM-1 hollow fiber membranes. All PIM-1/metal oxide hybrids are infiltrated twice with 5-hour hold time. In $AlO_x$/PIM-1, 92.6% of infiltrated aluminum atoms take octahedral coordination, which is hypothetically favored for the $AlO_x$ nanostrand growth within tortuous micropores of the PIM-1 skeleton.
Figure 20:
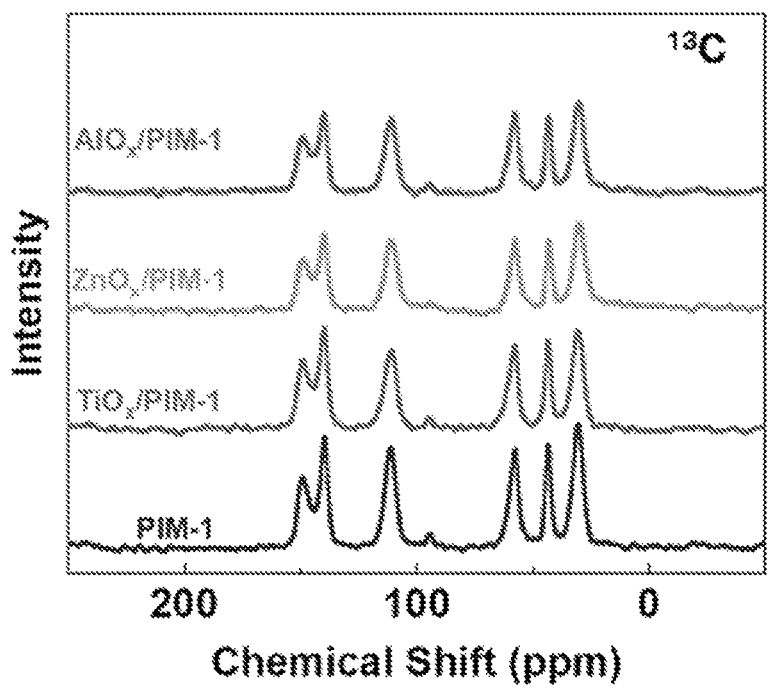
FIG. 20 is the solid-state $^{13}C$ NMR spectra of pristine PIM-1, $ZnO_x$/PIM-1, $TiO_x$/PIM-1, and $AlO_x$/PIM-1.
Figure 21:
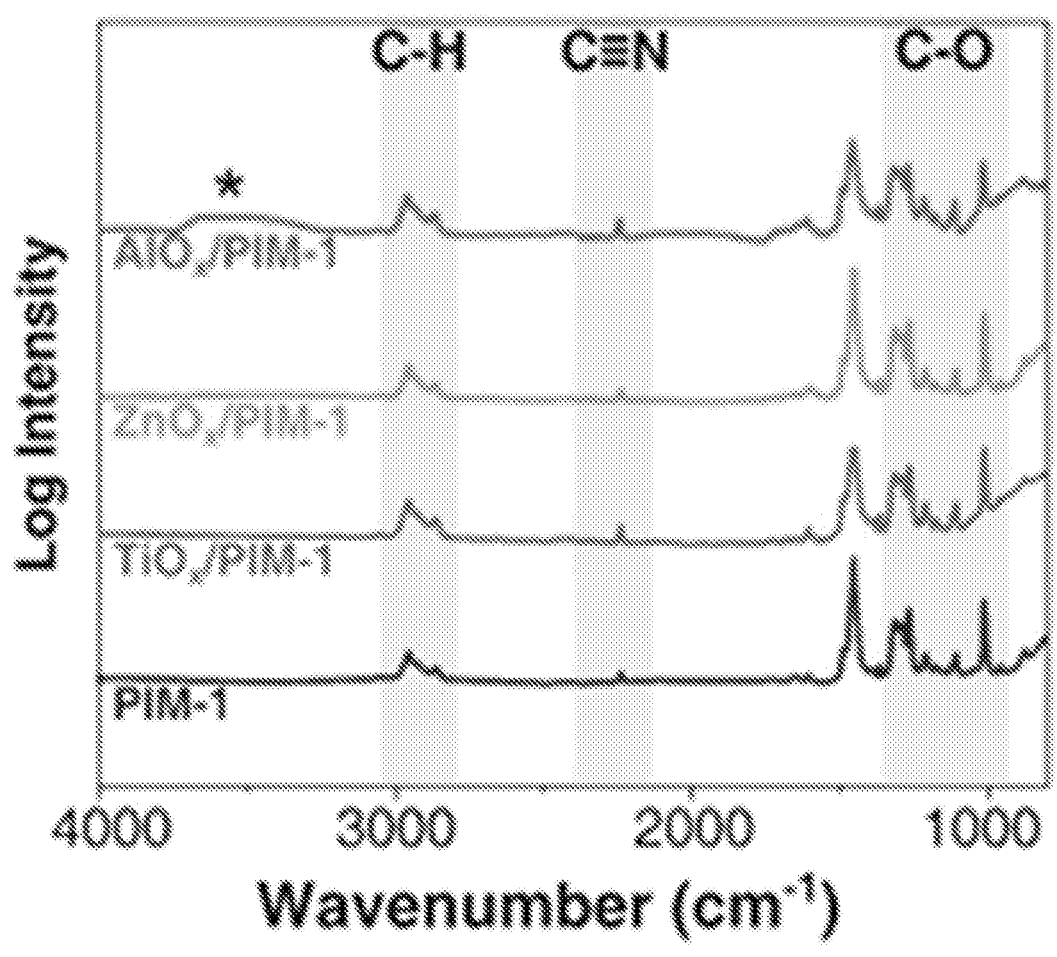
FIG. 21 is the logarithmic FTIR spectra for pristine PIM-1 and PIM-1 infiltrated with $AlO_x$, $ZnO_x$, and $TiO_x$. *Broad hydroxyl peaks are induced by absorbed water.

Chemical characterization indicated that the PIM-1 backbone remains unchanged after infiltration with various metal oxides. XPS results (FIG. 14) showed negligible changes in the binding energy of PIM-1's nitrogen and oxygen—the atoms most likely to react with the metal-organic precursors. The formation of unbound metal oxides was apparent in the $O^{1s}$ spectra (FIG. 14, 530.9 eV, 530.5 eV and 529.7 eV for $AlO_x$, $ZnO_x$, and $TiO_x$) and the corresponding metal atom spectra (FIG. 15-FIG. 18). These results were mirrored in solid-state $^{13}C$ NMR, solid-state 1H NMR (FIG. 19-FIG. 20), and FTIR (FIG. 21) in that no shifts in peak locations or intensities occurred for the polymer's structure. In total, these results imply that metal oxide clusters percolated throughout the hybrid structure but did not chemically bond to the PIM-1 polymer.

Figure 22:
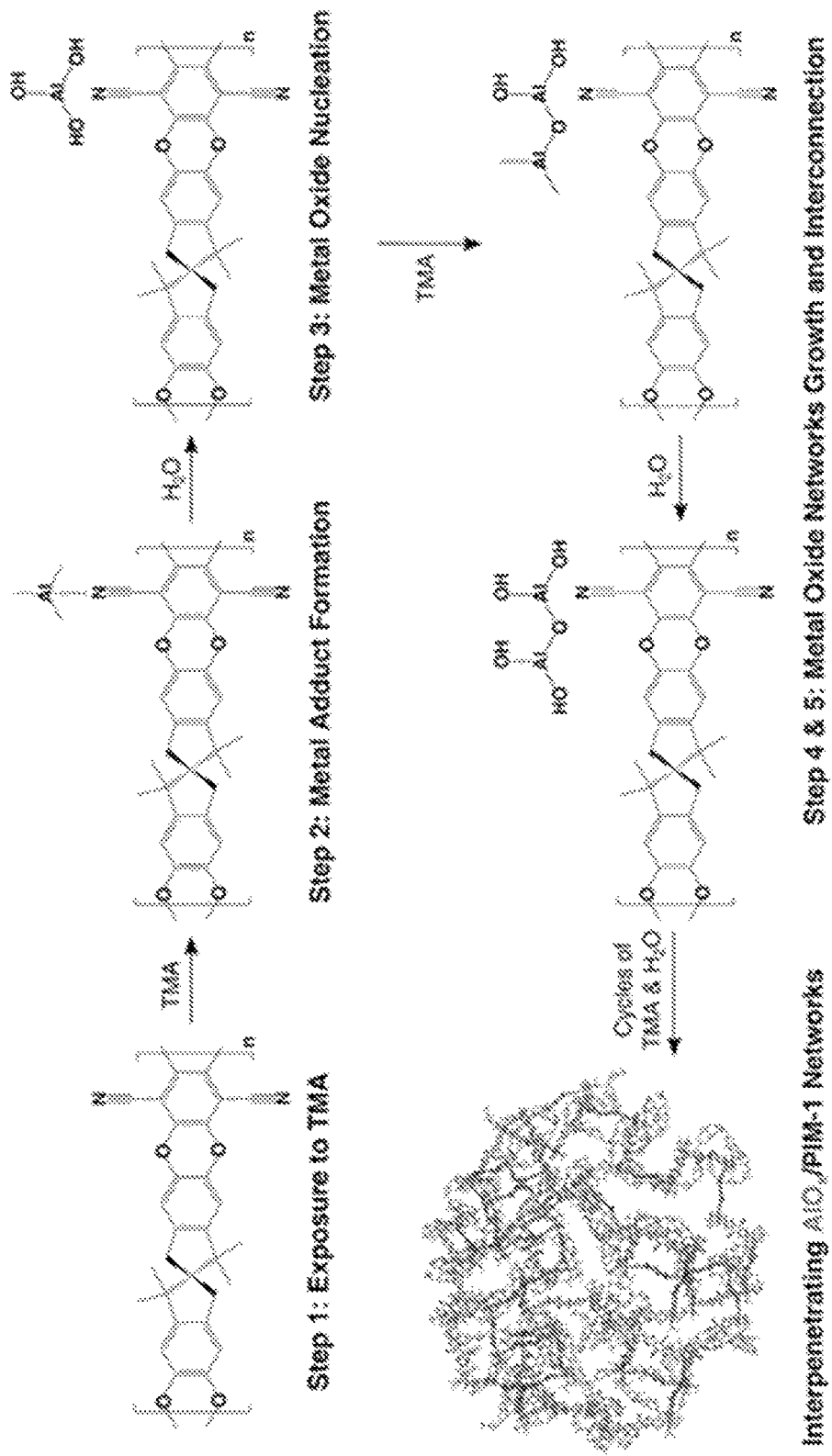
FIG. 22 is the proposed mechanism for metal oxide network formation via TMA VPI of PIM-1.
Figure 23:
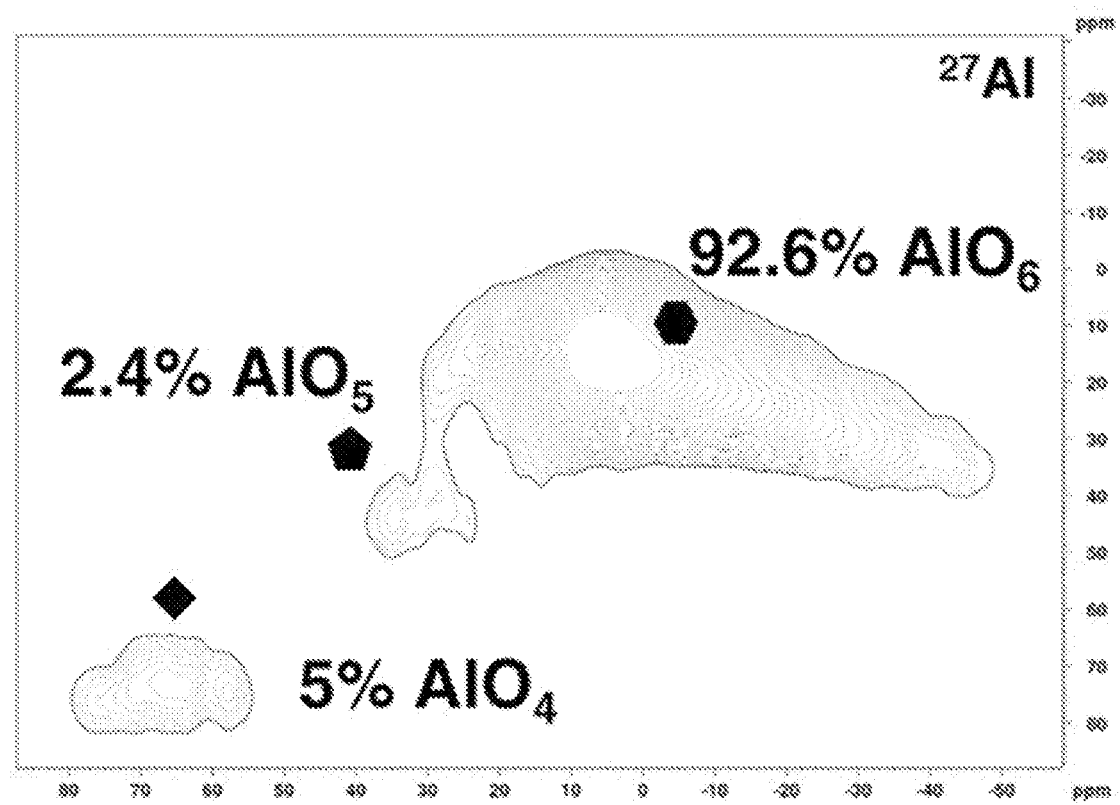
FIG. 23 is a two-dimensional view of the solid-state $^{27}Al$ NMR spectrum of $AlO_x$/PIM-1.
Figure 24:
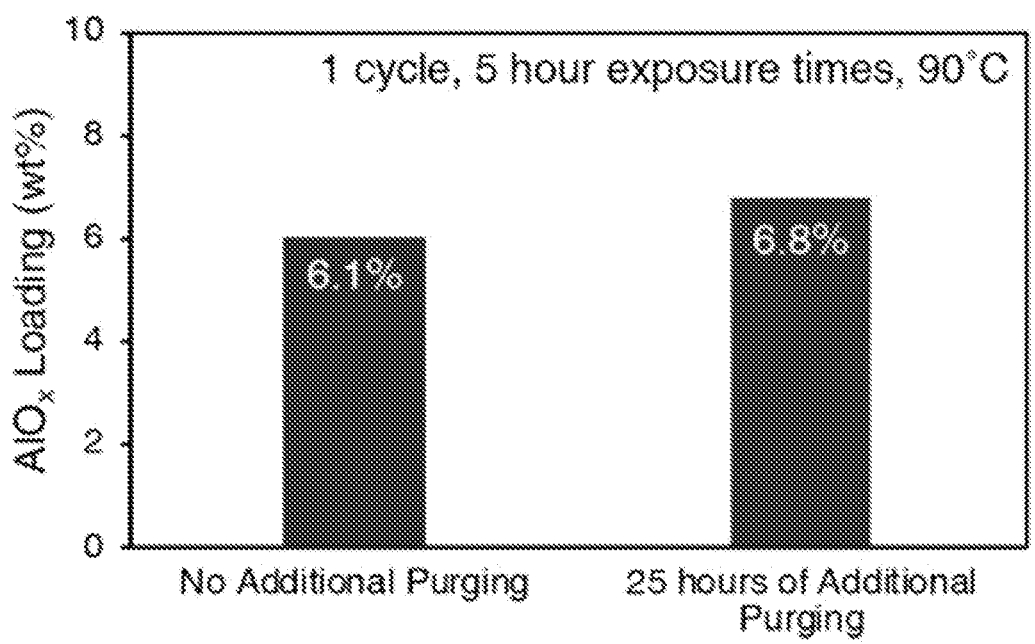
FIG. 24 is a plot of the $AlO_x$ loading for a control and long-duration purging experiment. PIM-1 hollow fiber membranes were methanol pre-treated, dried, and VPI treated with 1 cycle of $TMA/H_2O$ with 5 hour exposure times at 90° C. For one membrane ("no additional purging"), the typical procedure of $N_2$ purging five minutes and pumping five minutes was followed prior to the final 5-hour water vapor exposure. For the other membrane, an additional 25-hour purge step was placed between TMA and water vapor exposures, to determine whether TMA would diffuse out of the membrane during this time. Both methods resulted in similar weight percent loadings of $AlO_x$ in PIM-1. This result suggests that the binding state between TMA and PIM-1 is semi-permanent (irreversible) and does not significantly desorb during the VPI process.
Figure 25:
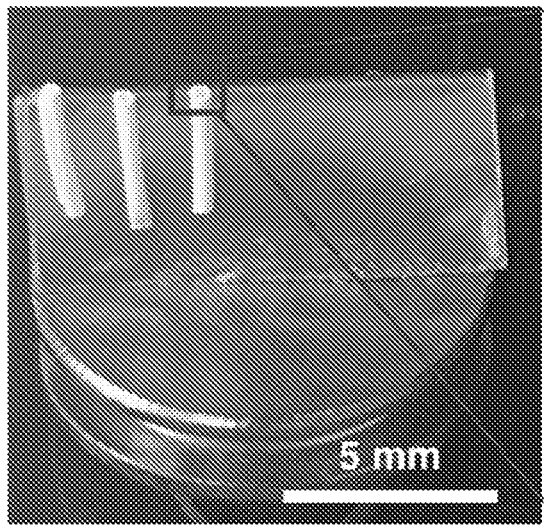
FIG. 25 is a photograph of alumina hollow fiber membranes obtained by annealing $AlO_x$/PIM-1 hybrid hollow fiber membranes in air (900° C.). Heat treating in air combusts the polymer and leaves just an $AlO_x$ nanoporous structure. The intact alumina hollow fiber membrane indicates the thorough infiltration of metal oxide into PIM-1 hollow fiber membranes. The porosity exhibited by the alumina hollow fiber membrane is consistent with our hypothesis that metal oxide nanostrands reside in the micropores of PIM-1, which is a porous template. The reduced porosity is likely due to sintering of the structure during heating.
Figure 26:
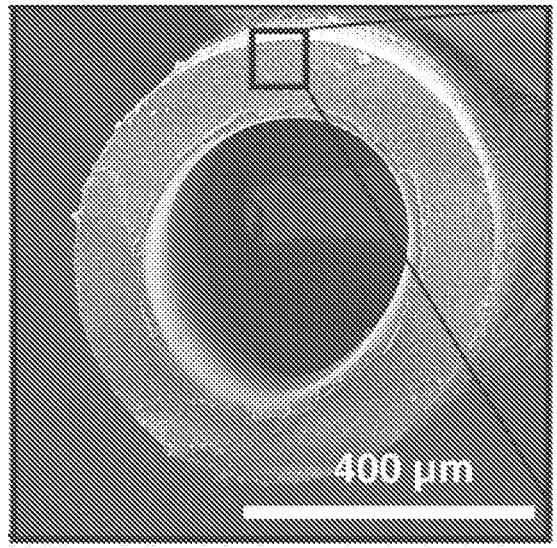
FIG. 26 is a SEM image of the portion of the alumina hollow fiber membrane after burn out indicated by the box in FIG. 25.
Figure 27:
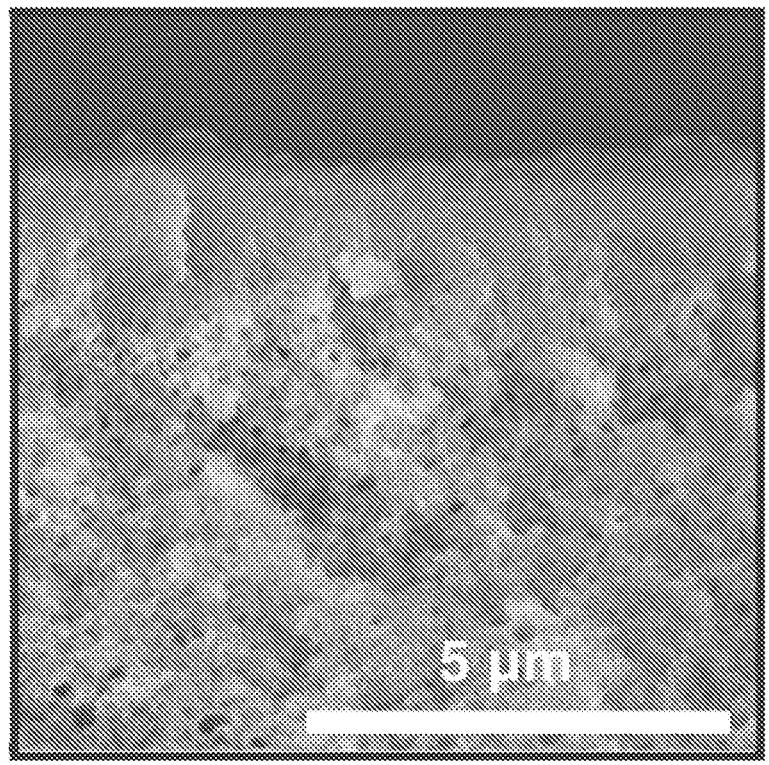
FIG. 27 is a higher magnification SEM image of the portion of the alumina hollow fiber membrane after burn out indicated by the box in FIG. 26.
Figure 28:
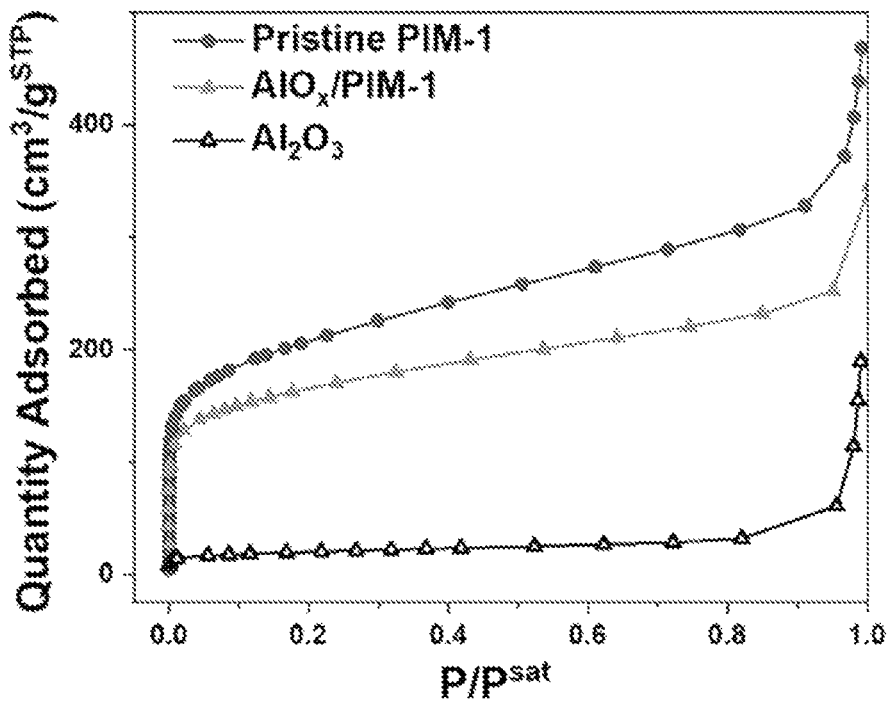
FIG. 28 is the cryogenic nitrogen physisorption of the alumina hollow fiber membranes compared with that of pristine PIM-1 hollow fiber membranes and $AlO_x$/PIM-1 hollow fiber membranes.
Figure 29:
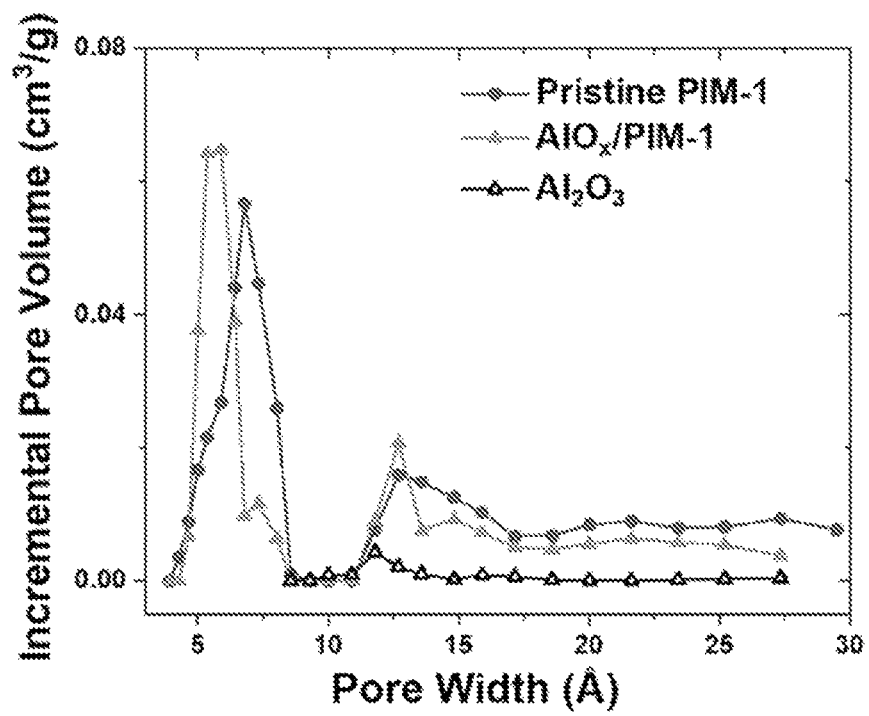
FIG. 29 is the pore size distribution of alumina hollow fiber membranes compared that of pristine PIM-1 hollow fiber membranes and $AlO_x$/PIM-1 hollow fiber membranes.

It was hypothesized that during VPI, metal-organic precursors formed semi-permanent adducts with the PIM-1's nitrile groups (FIG. 22), similar to the interaction previously observed between TMA and amine or nitro functional groups in other VPI processes (Jue et al. *Macromolecules* 2015, 48, 5780-5790). Coordination of aluminum in the proposed VPI mechanism shown in FIG. 22 was based on solid-state $^{27}Al$ NMR (FIG. 23). Experiments with long-duration purging between precursor exposure and water dose (FIG. 24) further supported the formation of these semi-permanent adducts as no loss in metal oxide loading was observed. Upon water exposure, the metal-organic was oxidized, the adduct released, and the inorganic became unbound metal oxide clusters (FIG. 22). Further condensation reactions and repeated VPI cycling interconnected these metal oxide clusters into an inorganic network (FIG. 22). This metal oxide network was detected by burning out the PIM-1 skeleton of the hybrid membrane and probing the residual microporous metal oxide structure via cryogenic $N_2$ physisorption (FIG. 25-FIG. 29).

To investigate the influence of different VPI parameters on the resulting hybrid materials, PIM-1 hollow fiber membranes were infiltrated with different metal oxides, for different hold times, and different VPI cycle numbers. Owing to the hierarchical porosity of hollow fiber membranes, the effect of diffusion rate and infiltration depth can be neglected. Weight loading of metal oxides in PIM-1 membranes was determined by TGA Q500 (TA Instruments). Hollow fiber membranes were placed in platinum sample pans and heated in flowing air. During each thermal gravimetric analysis, the temperature was first maintained at 110° C. for 1 hour to get rid of trapped moisture. After this in situ drying process, temperature was ramped to 900° C. at 10° C./min. PIM-1 hollow fiber membranes treated with methanol and infiltrated with $AlO_x$ (2-cycle VPI at 90° C. with 5-hour hold time) were transformed into porous alumina hollow fibers (FIG. 25-FIG. 27) as byproducts of thermogravimetric analysis.

Nitrogen physisorption was conducted at 77 K using a BELSORP-max (MicrotracBEL). PIM-1 hollow fiber membranes infiltrated with metal oxides were ground into fine powders and then dried under vacuum at 110° C. for 12 hours. BET surface areas were calculated from the low-pressure region ($p/p^{sat}<0.3$) of the cryogenic nitrogen physisorption isotherm. Pore size distribution was calculated via a $N_2$ DFT model.

Figure 30:
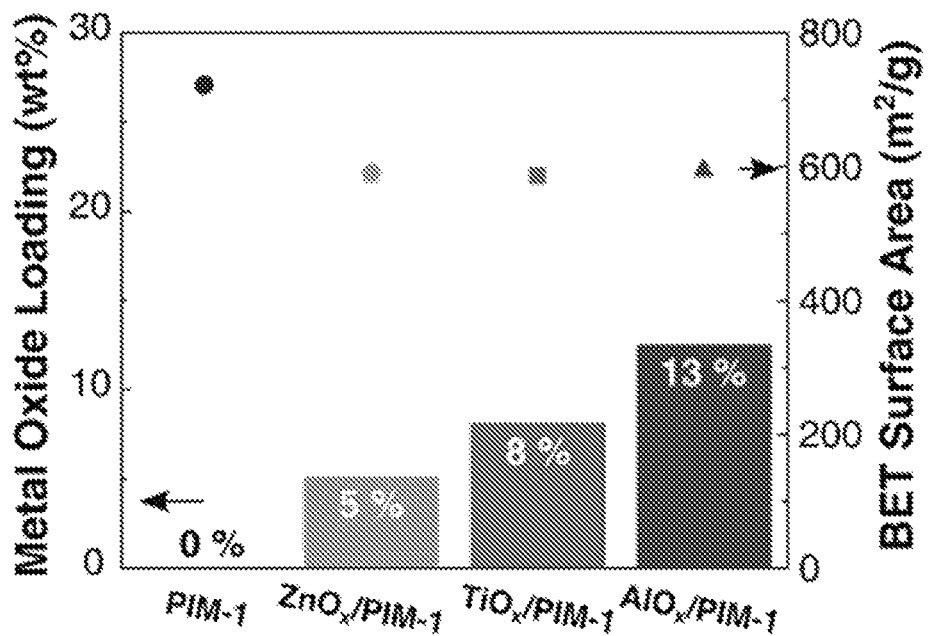
FIG. 30 is the metal oxide loading (bar graph) and BET surface area (dot plots, errors are smaller than markers) of PIM-1/metal oxide hybrids as a function of metal-organic chemistry.
Figure 31:
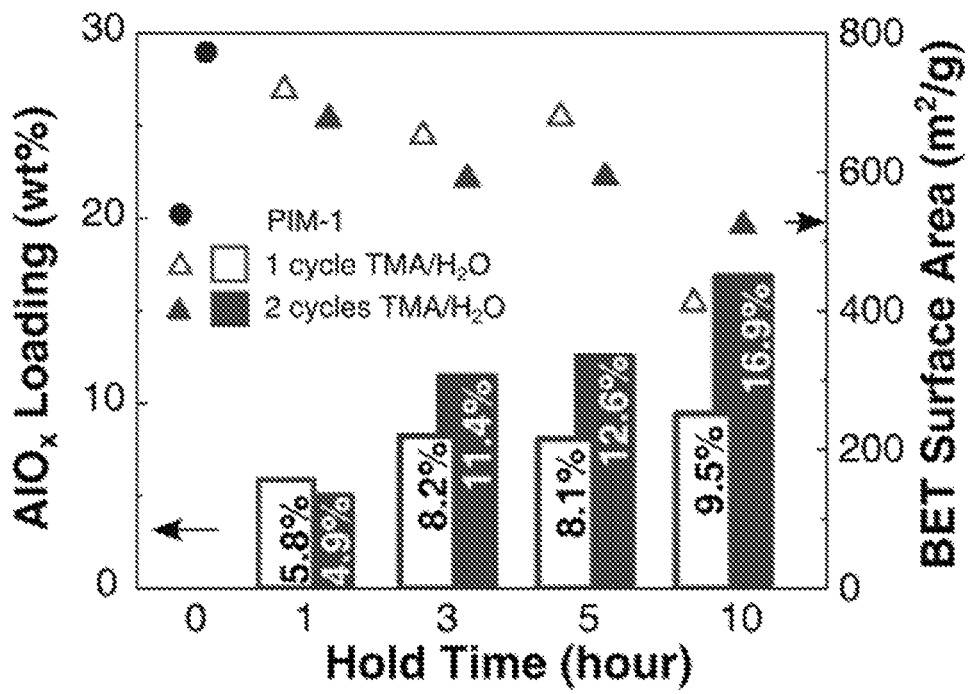
FIG. 31 is the metal oxide loading (bar graphs) and BET surface area (dot plots, errors are smaller than markers) of $AlO_x$/PIM-1 hybrid membranes as a function infiltration time and number of infiltration cycles.

To optimize hybrid membrane performance, the amount of metal oxide loading must be controlled to balance the trade-off between chemical stability and loss of porosity. The amount of metal oxide loading was quantified with thermogravimetric analysis (TGA) and the microporosity was measured via $N_2$ physisorption. Results are presented in FIG. 30-FIG. 32 and were collected from PIM-1 hollow fiber membranes infiltrated with three different metal-organic precursors: trimethyl aluminum (TMA), diethylzinc (DEZ), and titanium tetrachloride ($TiCl_4$). These data show that VPI chemistry and processing conditions affected the amount of metal oxide loading. The $AlO_x$/PIM-1 hybrid membrane showed significantly higher metal oxide loading than the other chemistries, yet exhibited nearly identical internal surface area, with only a 18% drop in surface area compared to neat PIM-1 (FIG. 30).

Figure 32:
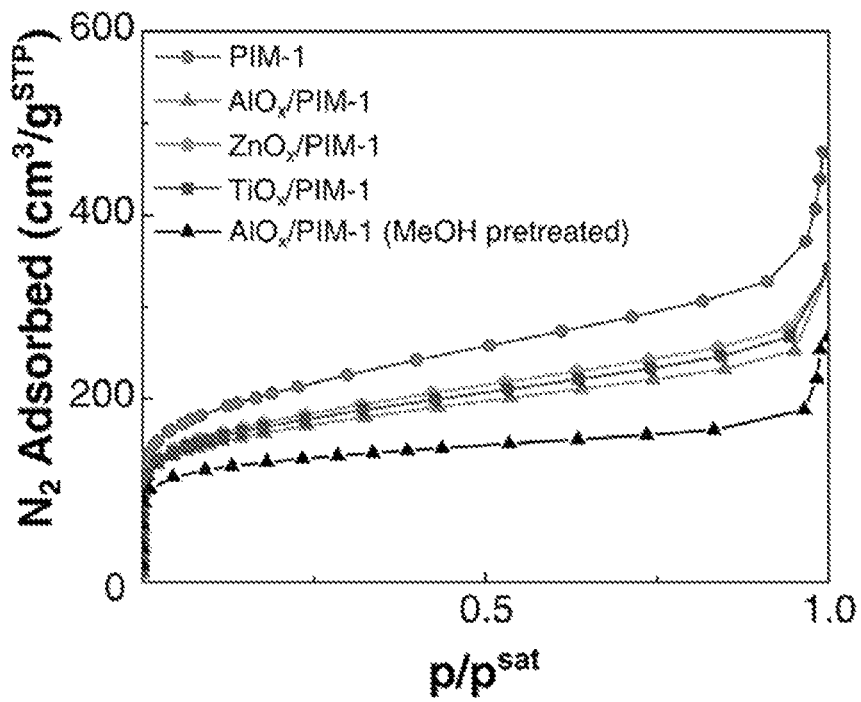
FIG. 32 is the nitrogen isotherms at 77 K for neat and infiltrated PIM-1 membranes showing the influence of VPI chemistry and processing conditions on microporosity of the membranes.
Figure 33:
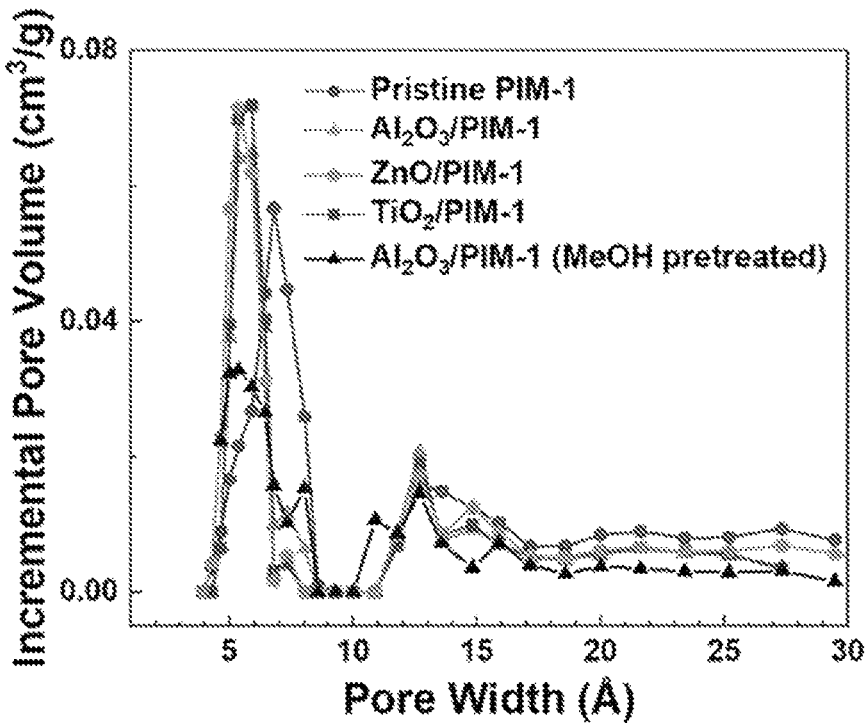
FIG. 33 is the pore size distribution calculated using $N_2$ DFT model.

Infiltrated metal oxide significantly reduces the size of micropores created by PIM-1 backbones (FIG. 33). Higher metal oxide loading results in a further reduction of pore sizes (FIG. 33). To determine how the entanglement of metal oxides with PIM-1 molecules influenced membrane swelling, cryogenic nitrogen sorption isotherms were created. In the resulting curves (FIG. 32), pristine PIM-1 hollow fiber membranes show their typical dual-mode sorption behavior: Langmuir-type (flat) sorption behavior in the low pressure region due to nitrogen physisorption into micropores and Henry-type (linear) behavior at higher pressures ($p/p^{sat}>0.2$) associated with nitrogen induced swelling. Importantly, the hybrid membranes still possess the characteristically high initial nitrogen uptake of pristine PIM-1 membranes. The high initial sorption behavior of PIM-1 is just one of many attributes that make it an attractive membrane material. Additionally, hybrid PIM-1 membranes all exhibit a reduction in swelling and a more ideal (flat) Langmuir sorption behavior. The degree of swelling reduction is consistent with the metal oxide loading. $AlO_x$/PIM-1 hybrid membranes pre-treated with methanol have the highest metal oxide loadings and accordingly show nearly ideal (flat) Langmuir sorption (until $p/p^{sat}>0.8$).

Figure 34:
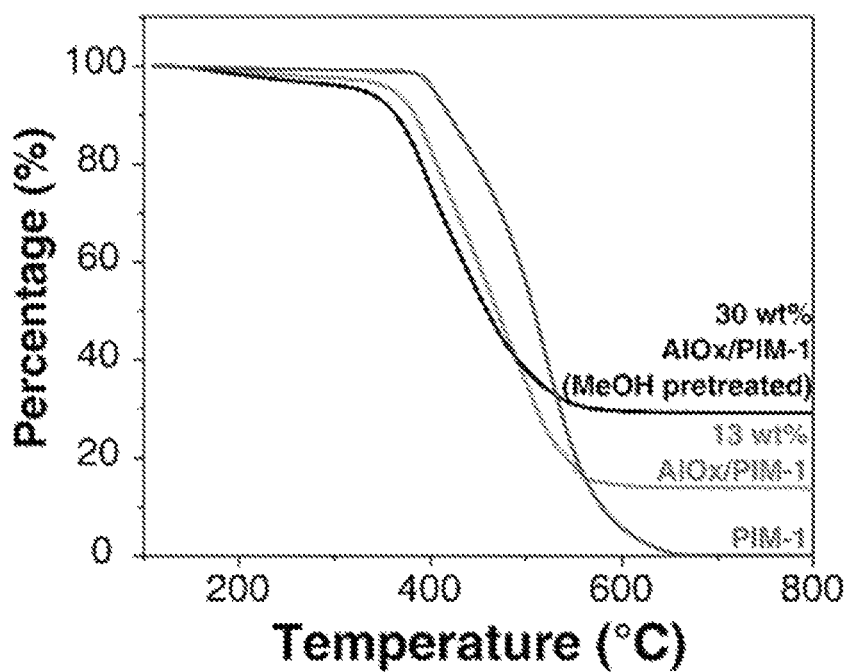
FIG. 34 is a plot that shows that methanol pretreatment effectively increased metal oxide loading. PIM-1 hollow fiber membranes with and without methanol pretreatment were VPI treated with 2 cycles of $TMA/H_2O$ with 5 hour exposure times at 90° C. Methanol pretreatment successfully increased the $AlO_x$ loading from 13 wt % to 30 wt %.

Generally, longer VPI exposure times or more VPI cycles increased metal oxide loading, deepened metal oxide penetration, and decreased BET surface area (FIG. 31, FIG. 32, FIG. 7, FIG. 9). Pretreatment of PIM-1 with methanol, which can reverse PIM-1's aging and increase free volume (Jue et al. *Macromolecules* 2015, 48, 5780-5790; Budd et al. *J. Memb. Sci.* 2008, 325, 851-860), also increased metal oxide loading (FIG. 34). The interpenetrating metal oxide networks inhibited the swelling induced by guest molecules (FIG. 35 and FIG. 36) and resulted in more Langmuir-type $N_2$ isotherms as metal oxide loading increased (FIG. 32, FIG. 33).

Toluene and water isotherms were measured using Dynamic Vapor Sorption system (DVS Vacuum, Surface Measurement Systems) to investigate the influence of interpenetrating metal oxide networks on the interaction between toluene/water and PIM-1 membranes. PIM-1 hollow fiber membranes with and without VPI treatment were placed and in situ dried at 110° C. in the sample chamber of DVS. The samples were then exposed toluene or water vapor of certain pressure at 25° C. Equilibrium criteria was set to less than 0.001 wt % change within 10 min. Each isotherm was determined for at least 3 times to calculate the standard deviation.

Figure 35:
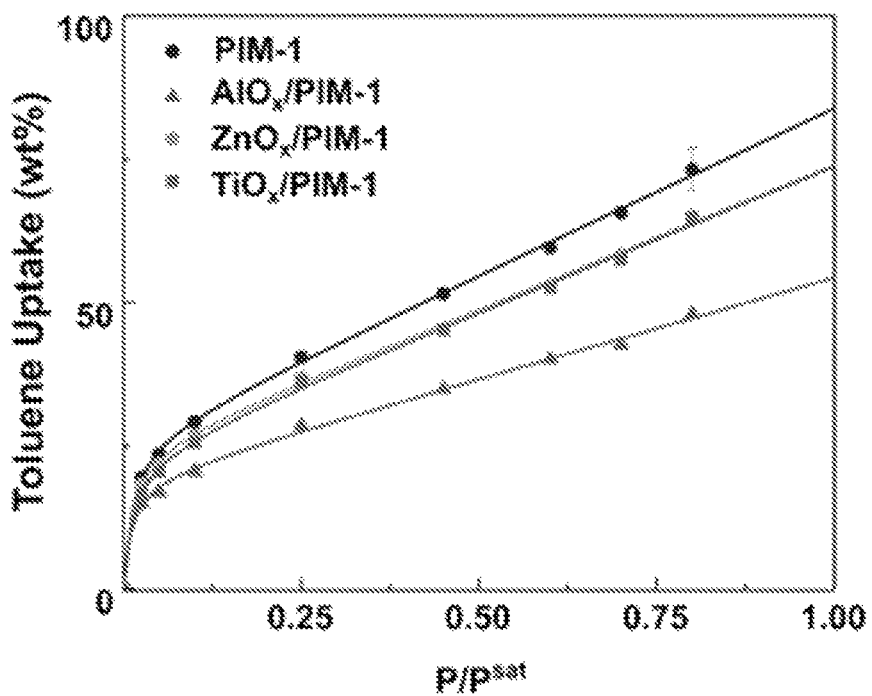
FIG. 35 is the toluene adsorption isotherms measured at 25° C. which show the influence of interpenetrating metal oxide networks on the interaction between toluene and PIM-1 membranes.

A reduction in swelling is observed in the toluene adsorption isotherms measured at 25° C. (FIG. 35). The toluene isotherms can be well fitted by dual-mode sorption equations, which is a combination of Langmuir-type adsorption and Henry-type sorption. By comparing the change in the contribution of Henry-type sorption, it was found that the toluene-induced swelling in $AlO_x$/PIM-1 was reduced by 39%. These trends revealed that the interpenetrating metal oxide networks protect PIM-1 membranes from swelling while preserving their vital membrane characteristics.

Figure 36:
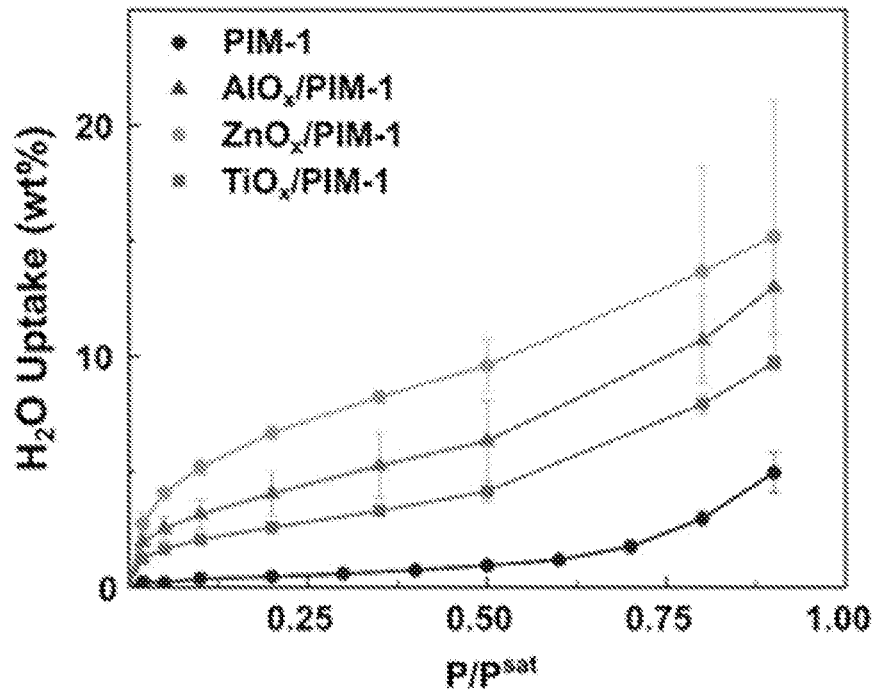
FIG. 36 is the $H_2O$ sorption isotherms measured at 25° C. showing the influence of interpenetrating metal oxide networks on the interaction between water and PIM-1 membranes.
Figure 37:
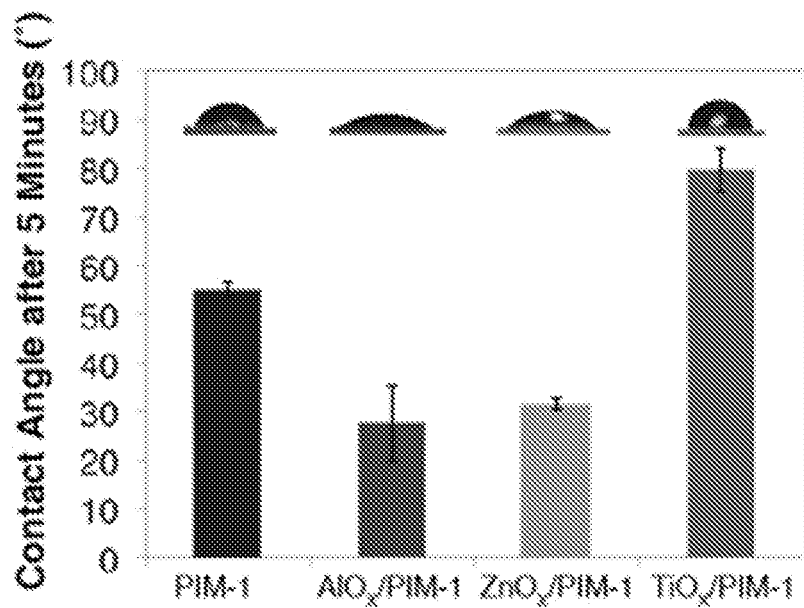
FIG. 37 is the contact angle measurements showing the influence of interpenetrating metal oxide networks on the interaction between water and PIM-1 membranes.

The hybrid membranes also exhibited a change in hydrophilicity, which could open new pathways for aqueous separations (FIG. 36, FIG. 37). While pristine PIM-1 is hydrophobic, the metal-oxide-infiltrated PIM-1 hollow fiber membranes show significantly higher water uptake (FIG. 36). This increase in water molecule affinity results from additional adsorption sites provided by the interpenetrating metal oxide networks (FIG. 36). The increase in hydrophilicity for $ZnO_x$ and $AlO_x$/PIM-1 membranes is further supported by contact angle measurements (FIG. 37). Contact angle measurements were conducted on a Ramé-Hart Model 250 Goniometer/Tensiometer using drop size volumes of 10 microliters. Measurements and photos were taken 5 minutes after dispensing. $TiO_x$ membranes, however, exhibit a more hydrophobic contact angle (FIG. 37). This may be due to increases in surface roughness on the PIM-1 membranes. Generally, the more hydrophilic nature of $ZnO_x$ and $AlO_x$/PIM-1 membranes may provide a pathway for the use of PIM-1 based membranes in aqueous separations.

An Avantes Avaspec-2048 UV-vis spectrometer with a halogen light source was used to determine dissolution percentages of PIM-1 and $AlO_x$/PIM-1 in tetrahydrofuran over time. Short term experiments (up to several hours) were conducted where a treated or untreated hollow fiber membrane with known mass was placed directly in a cuvette with a known amount of solvent. Measurements were taken automatically by the software over time. Absorption values were translated into concentrations using Beer's law and a set of reference standards. Long-term measurements (over a few hours) were conducted in vials containing a known mass of hollow fiber membrane and known volume of THF. Aliquots were taken from these vials and diluted prior to measurement with UV-Vis to ensure absorption values in the range of Beer's law. For $AlO_x$/PIM-1 membranes, TGA results were used to calculate the mass of the membrane due to PIM-1. This mass was used to calculate percent dissolved.

Figure 38:
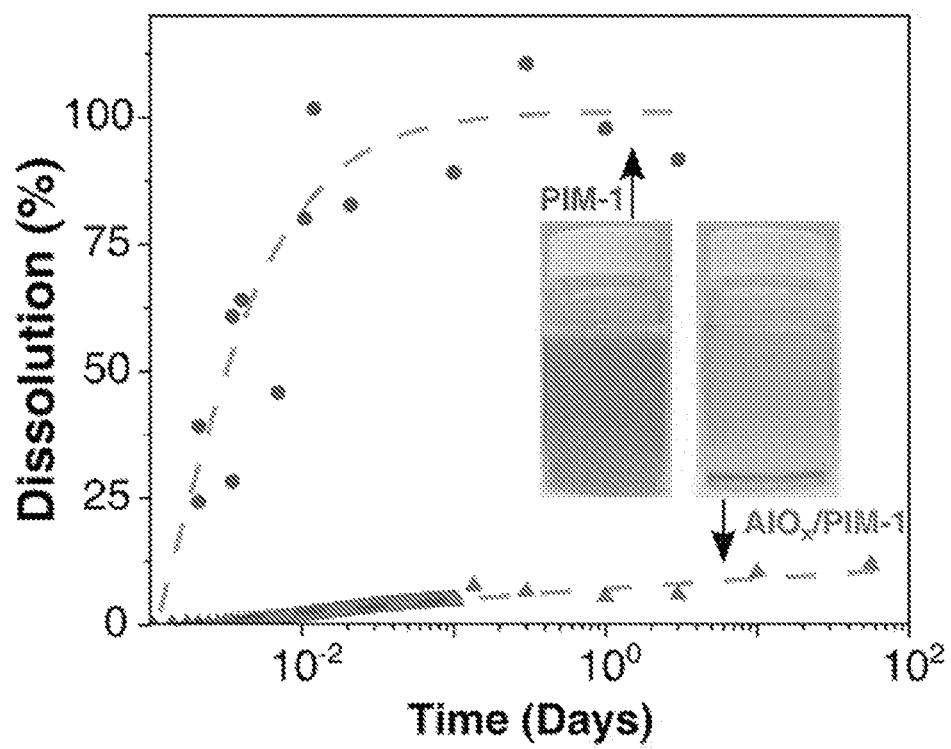
FIG. 38 is the dissolution of PIM-1 and $AlO_x$/PIM-1 membranes in THF determined via UV-Vis showing the influence of VPI chemistry on the chemical stability of the hybrid membranes. The dashed lines are included to guide the eye.

Concurrent with an increase in metal oxide loading was an improvement in solvent resistance. When tested against strong solvents for PIM-1 (tetrahydrofuran [THF], dichloromethane [DCM], and chloroform [$CHCl_3$]—all of which dissolve PIM-1 within minutes) all hybrid membranes showed improved stability, many remaining stable throughout 3 months of testing. Among the hybrid membranes studied here, $AlO_x$/PIM-1 membranes exhibited the highest solvent stability. FIG. 38 illustrates this stability in THF. While PIM-1 membranes fully dissolve within one day, $AlO_x$/PIM-1 hybrid membranes lose only 10% of their weight after 1 month of immersion in THF (FIG. 38).

Based on this evaluation of physical properties, 2 VPI cycles of TMA-$H_2O$ with 5-hour holds and a methanol pretreatment was determined to achieve the best trade-off between retaining microporosity and imparting chemical stability for the systems tested herein. This VPI treatment was then applied to PIM-1 hollow fiber membranes and thin film PIM-1 membranes supported by cross-linked Torlon® for organic solvent nanofiltration performance testing. To increase infiltration of thin film composite PIM-1 membranes, a 3 second precursor dose time was used.

Torlon™ support membranes were fabricated via nonsolvent induced phase inversion. Torlon™, tetrahydrofuran, ethanol and N-Methyl-2-pyrrolidone were mixed with a mass ratio of 20:14:10:56 in a sealed container. Once the polymer was fully dissolved, the homogeneous solution was then cast into a liquid film via a blade on a clean glass plate. The liquid film was then transferred to a well-ventilated hood to assist the formation of a partial skin layer. After 1 minute, the liquid film was immersed into a deionized water bath. Phase inversion completes within 1 hour resulting in an opaque porous Torlon™ membrane. The membrane was then stored in a new water bath for 12 hours, followed by three washing cycles in methanol and three washing cycles in n-hexane sequentially. During each washing step, the membrane was immersed in the solvent bath for 3 hours. After vacuum drying at 200° C. for 12 hours, these Torlon™ support membranes were stored in the ambient environment before cross-linking.

These Torlon™ membranes were crosslinked by p-xylylenediamine. Dry Torlon™ membranes were immersed in 10 wt % p-xylylenediamine methanol solution for 24 hours at room temperature. After cross-linking, the membranes were washed with methanol and n-hexane three times respectively. After vacuum drying at 100° C. for 12 hours, these cross-linked Torlon™ support membranes were stored in the ambient environment before spin coating.

PIM-1 thin films were coated onto these cross-linked Torlon™ support membranes via spin coating. 1 wt % PIM-1 in chloroform was dropped onto the cross-linked Torlon® support membranes and spun at 500 rpm for 10 min. During the spin coating process, the membrane processing chamber was saturated with chloroform vapor to slow the drying process. After spin coating, the resulting PIM-1 thin film composite membranes were dried under vacuum at 100° C. for 24 hours.

Figure 39:
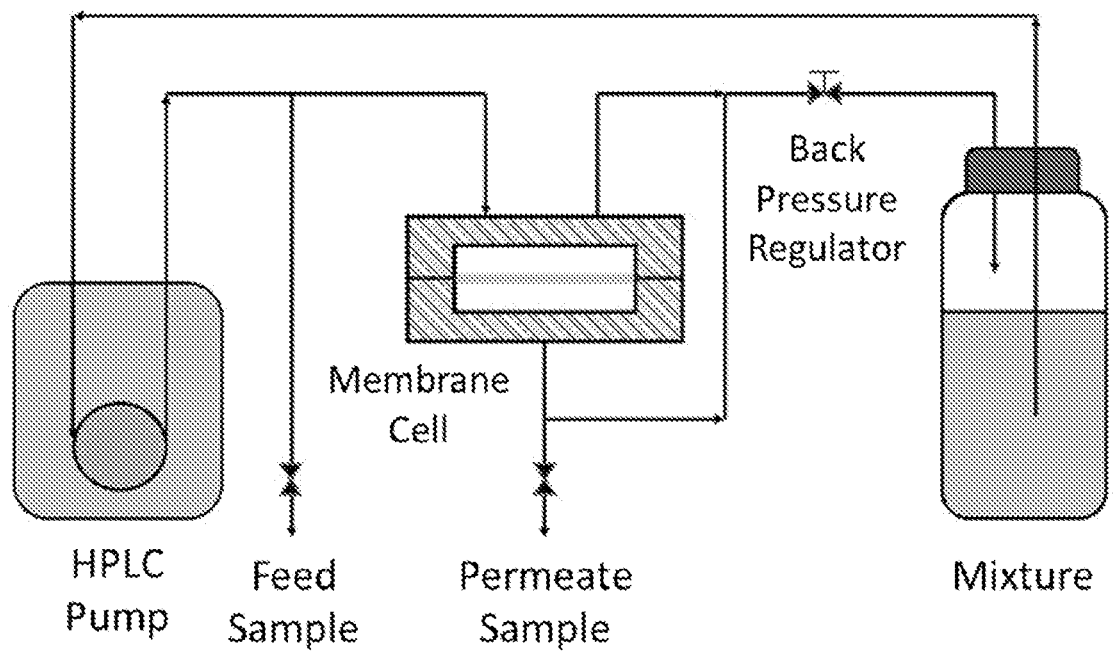
FIG. 39 is a schematic diagram of a cross-flow organic solvent permeation system.

Organic solvent nanofiltration was conducted in a cross-flow permeation system (FIG. 39). A HPLC pump delivers pressurized mixture solution into the feed side of the membrane cell. The feed solution contact with the membrane and then flow through the backpressure regulator into the mixture container. Permeate is directed by a three-way valve into the mixture container or a sampling vial. Feed solution circulates inside the feed-side chamber of the membrane cell, disturbing the boundary layer near the membrane. Although a flat membrane cell is illustrated here, hollow fiber membrane modules can also be tested in this setup.

For the organic solvent nanofiltration tests, feed solution flowrate was set to at least ten times that of the permeation rate. Trans-membrane pressure was maintained at 10 bar for thin film composite membranes and 10 psi for hollow fiber membranes (pristine PIM-1 hollow fiber membranes cannot withstand higher pressure when exposed to ethanol). Permeates were collected in glass sample vials. The Thermo Evolution 220 UV-vis system (Thermo Fisher Scientific) was used to determine the dye rejection, and an Agilent 1200 High Performance Liquid Chromatography (HPLC) was used to determine the polystyrene oligomer rejection.

Figure 40:
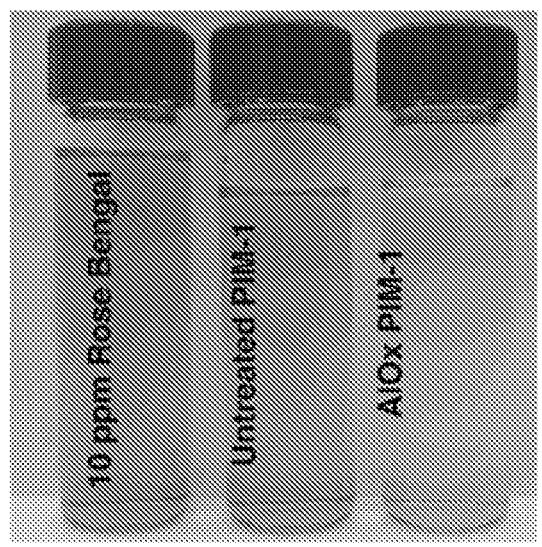
FIG. 40 is a photograph illustrating the organic solvent nanofiltration performance of PIM-1 and $AlO_x$/PIM-1 hybrid membranes. 10 ppm Rose Bengal ethanol permeate before (left) and after filtration by PIM-1 (center) and $AlO_x$/PIM-1 (right) hollow fiber membranes.
Figure 41:
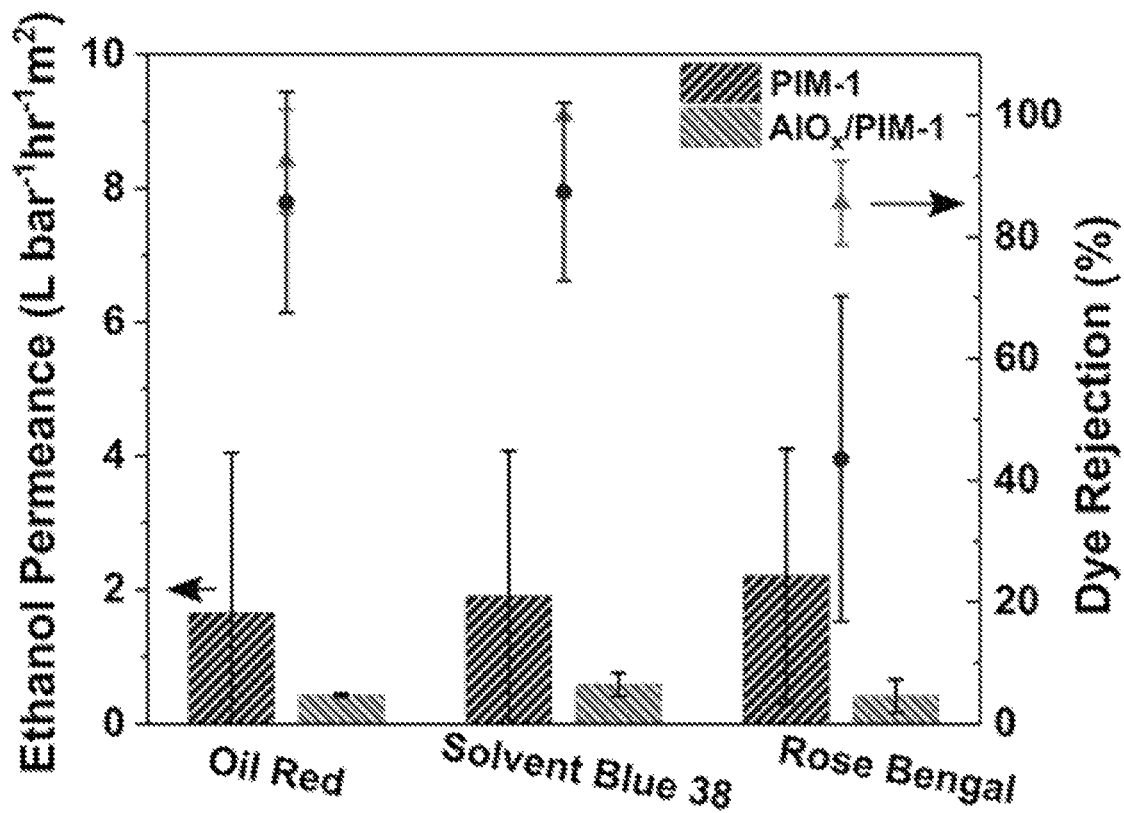
FIG. 41 is a plot of the dye rejection in ethanol by PIM-1 and $AlO_x$/PIM-1 hollow fiber membranes. Owing to stronger affinity to untreated PIM-1, bulkier Rose Bengal (973.67 g/mol) is retained less than Solvent Blue 38 (782.18 g/mol) and Oil Red (408.505 g/mol). The deviation from polystyrene retention curve is attributed to the strong interactions between dye molecules and PIM-1.1 In contrast, $AlO_x$/PIM-1 membranes achieve more than 80% rejection for all three dyes, indicating the infiltrated metal oxide interrupts the interaction between the dye molecules and the membrane.
Figure 43:
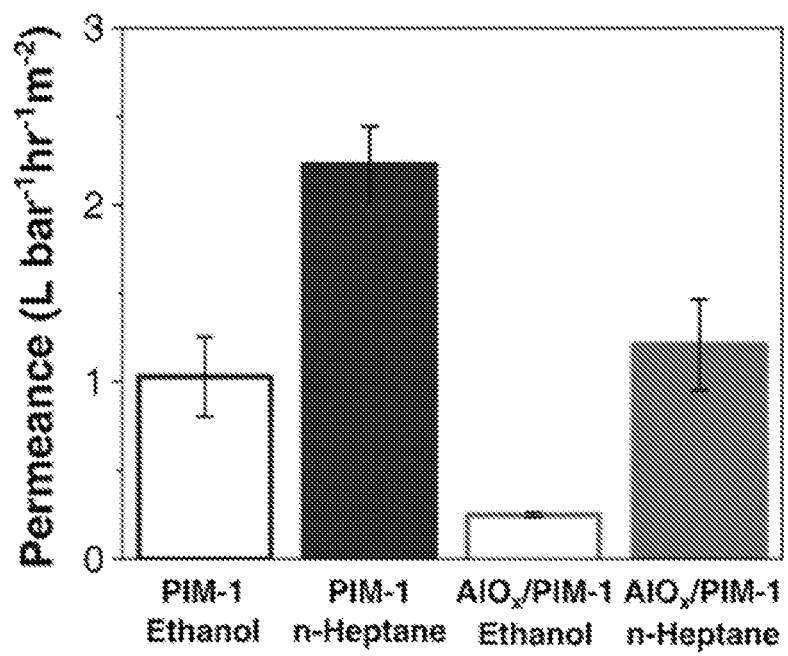
FIG. 43 is a plot of the organic solvent nanofiltration performance of PIM-1 and $AlO_x$/PIM-1 hybrid membranes. Steady-state ethanol and n-heptane permeance of PIM-1 and $AlO_x$/PIM-1 thin composite films under 10-bar transmembrane pressure.
Figure 44:
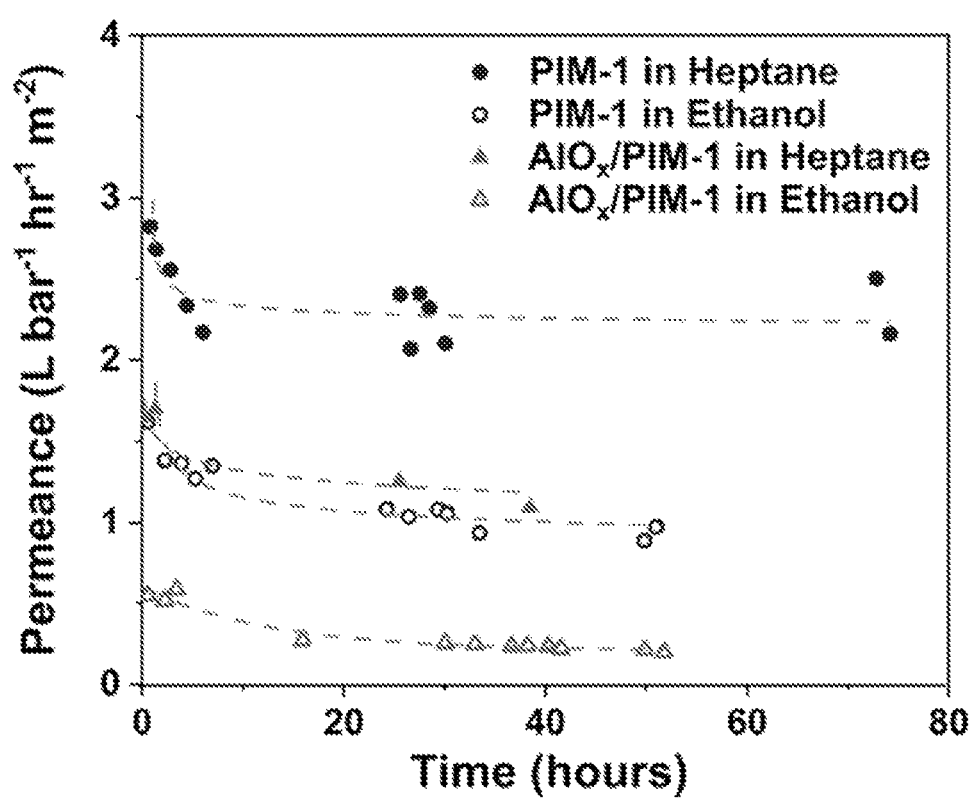
FIG. 44 is a plot of the long-term ethanol and heptane permeance of PIM-1 and $AlO_x$/PIM-1 thin composite films. Transmembrane pressure is 10 bar. The rapid reduction of permeance during initial period may contribute to the deformation of support membranes. The grey lines are included to guide the eye.

The organic solvent nanofiltration (OSN) separation performance of these solvent-resistant hybrid membranes was quantified using cross flow permeation experiments (FIG. 39) with dye molecules (FIG. 40, FIG. 41) or polystyrene oligomers (FIG. 42, FIG. 43) as solutes and ethanol or heptane as solvents. FIG. 43 and FIG. 44 plot the permeance of the hybrid membranes versus neat PIM-1 films for ethanol and n-heptane solvents. The hybrid membranes showed lower permeance than the most advanced thin film PIM-1 membranes but all solvent flows were more than sufficient for chemical separations and future hybrid membrane designs can further optimize the selective layer thickness to offset for this loss in permeance (Cook et al. *J. Memb. Sci.* 2018, 558, 52-63; Gorgojo et al. *Adv. Funct. Mater.* 2014, 24, 4729-4737). When separating dye molecules (Rose Bengal) in ethanol, the hybrid membranes rejected twice as much dye as neat PIM-1 membranes (86% versus 43%, FIG. 40, FIG. 41). This result suggests that the interpenetrating $AlO_x$ networks within these hybrid membranes interrupted the strong interaction between dye molecules and the membrane, reducing dye permeation through the hybrid membranes. The VPI modification provided sufficient stabilization and resistance to swelling to enable the rejection of strongly sorptive solutes, which are typically challenging for polymer-based membranes to remove.

Figure 42:
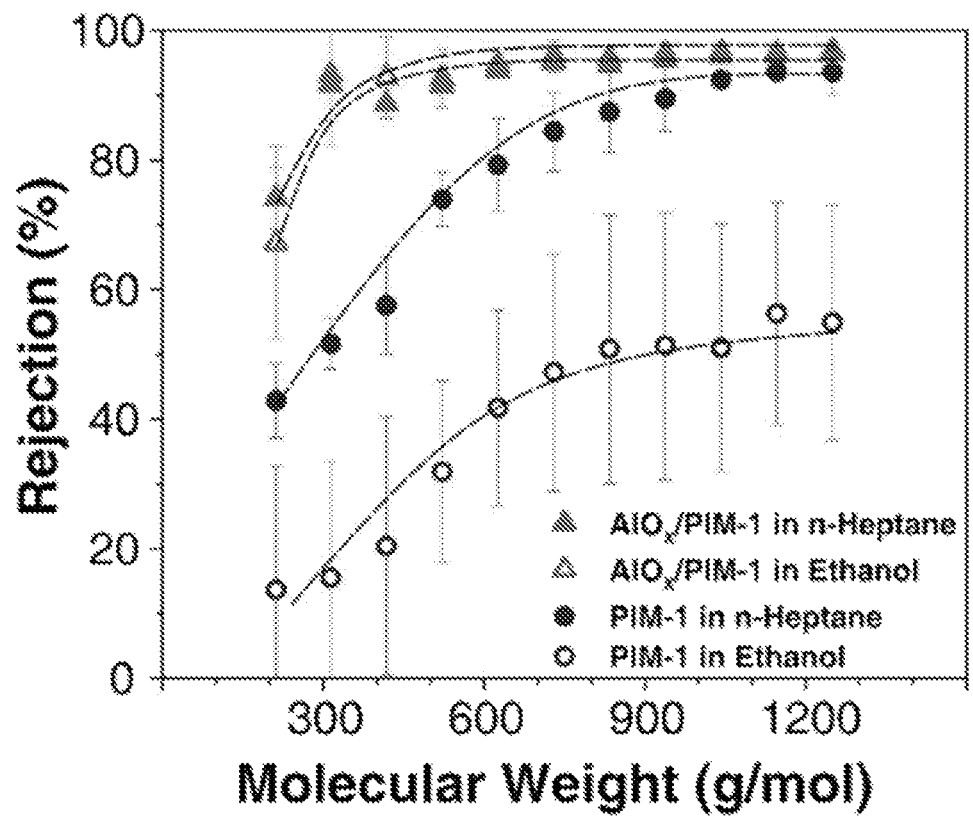
FIG. 42 is a plot of the organic solvent nanofiltration performance of PIM-1 and $AlO_x$/PIM-1 hybrid membranes. Molecular weight cut-off curves of PIM-1 and $AlO_x$/PIM-1 thin film composites in ethanol and n-heptane using polystyrene oligomers as markers. The dashed lines are included to guide the eye.

FIG. 42 plots polystyrene oligomer retention as a function of molecular weight in n-heptane and ethanol. This data illustrates the size-based molecule separation performance of the membranes in various solvents. For the thin untreated PIM-1 composite membrane, the 80% molecular weight cut-off (MWCO; the smallest molecular weight the membrane "successfully" rejects) was about 600 g/mol in n-heptane, a solvent that does not significantly swell or plasticize PIM-1. However, in ethanol, a solvent that does significantly swell and plasticize PIM-1, the 80% molecular weight cut-off increased to more than 1200 g/mol. This loss of size-based separation performance for PIM-1 in solvents that plasticize the polymer is consistent with other experiments in the literature (Cook et al. *J. Memb. Sci.* 2018, 558, 52-63). In contrast, hybrid $AlO_x$/PIM-1 membranes showed improved polystyrene rejection in both n-heptane and ethanol solvents (FIG. 42). $AlO_x$/PIM-1 in n-heptane showed overall higher rejection (above 90%) than neat PIM-1 and has a 90% molecular weight cut-off of 400 g/mol. This decrease in molecular weight cut-off was expected based on the results that the infiltrated $AlO_x$ not only reduced the micropore size within the membrane but also inhibited solvent-induced swelling (FIG. 33, FIG. 35). When the separation was conducted in ethanol, $AlO_x$/PIM-1 showed identical separation behavior as in n-heptane (FIG. 42). These results show that these hybrid membranes have outstanding size-based separation performance in plasticizing solvents when compared to prior reports of solution-processable microporous polymer membranes (Cook et al. *J. Memb. Sci.* 2018, 558, 52-63; Fritsch et al. *J. Memb. Sci.* 2012, 401-402, 222-231).

In summary, vapor phase infiltration can be used to create unbound but interpenetrating atomic-scale metal oxide networks within microporous polymer membranes like PIM-1. Unlike pure polymer membranes, these organic-inorganic hybrid membranes strongly resisted swelling and dissolution in aggressive solvent environments. With this added chemical stability, hybrid PIM-1 membranes not only outperformed untreated PIM-1 membranes for chemical separations in standard environments but also provided consistent performance in environments that would swell or dissolve the neat polymer.

The VPI process is low-temperature and solvent-free and can be conducted inside pre-formed membrane modules of any arbitrary form factor, thus simplifying manufacturing scale-up. Further, the VPI processing can be easily integrated with state-of-the-art membrane modules, suggesting that this treatment can be readily adopted into the large-scale manufacturing of advanced membranes. The methods described herein can establish a scalable, solvent-free, post-synthesis treatment for transforming microporous polymers into hybrid membranes that can supplant energy intensive distillation processes for chemical separations.

Example 2

Figure 45:
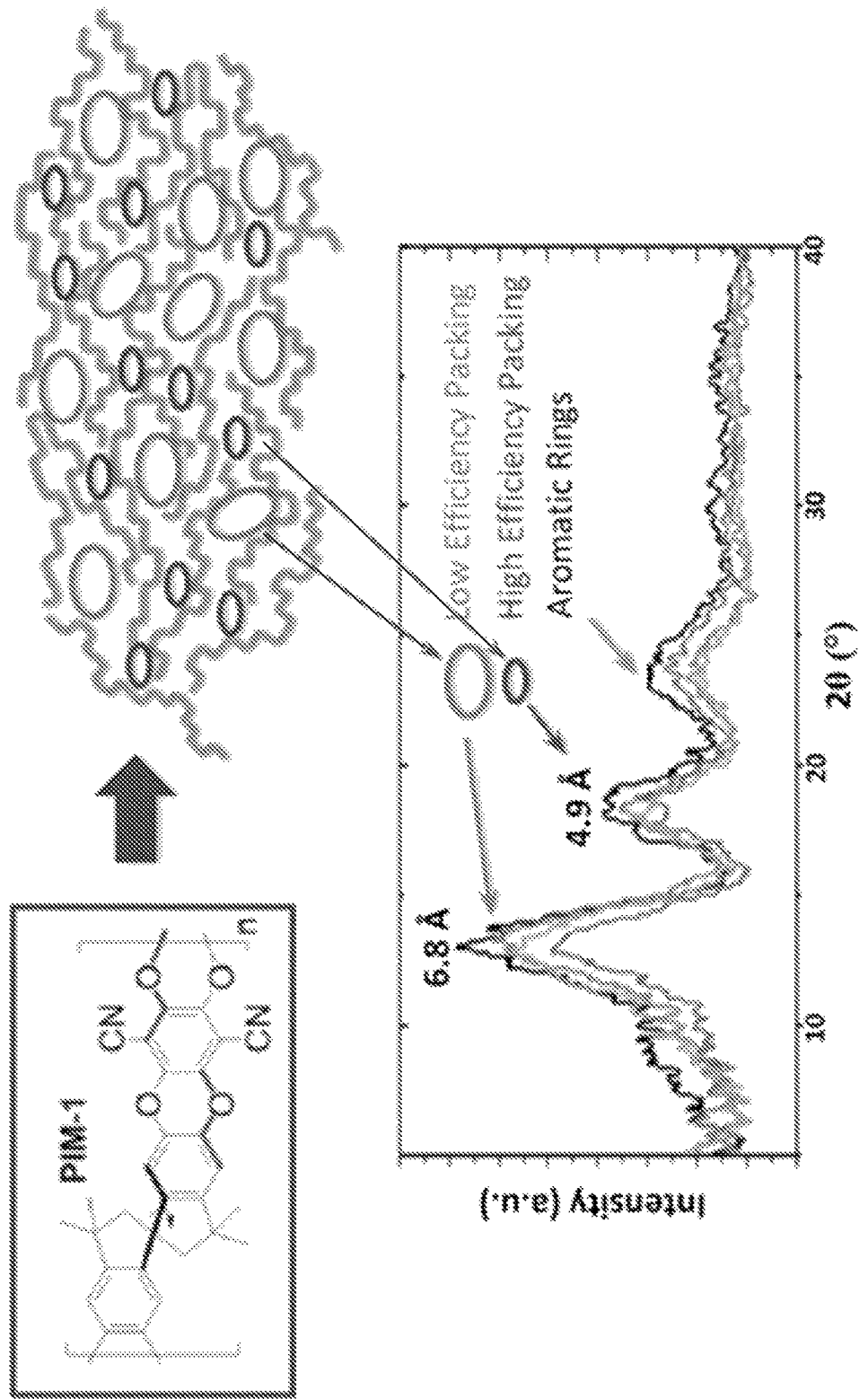
FIG. 45 is a schematic diagram and plot of the porosity in the polymer of intrinsic microporosity 1 (PIM-1).
Figure 46:
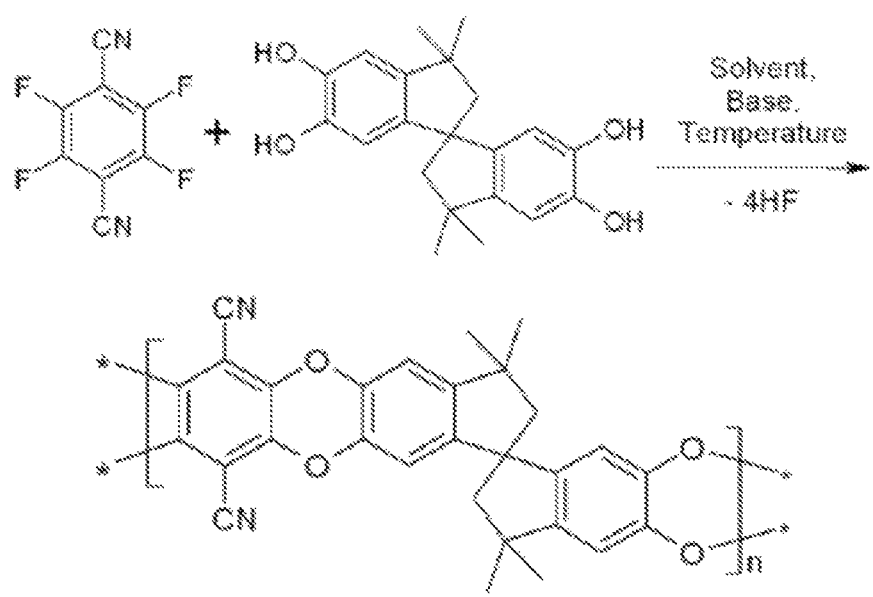
FIG. 46 shows the synthesis and stricture of the polymer of intrinsic microporosity 1 (PIM-1).

Polymer of intrinsic microporosity 1 (PIM-1) is a polymer whose contorted shape and rigid backbone result in materials with high levels of free volume or "microporosity" (FIG. 45 and FIG. 46). This free volume has shown utility in a variety of applications (e.g., sensing, separations, gas storage, etc.). PIM-1 can be dissolved in various solvents and solution-processed into different shapes for targeted applications (e.g., wovens, fibers, etc.). The combination of microporosity and solution-processability makes PIM-1 an ideal material for applications like absorption, membrane separation, etc. However, when exposed to organic solvents or vapors, due to its solution-processability, PIM-1 experiences rapid aging, plasticization, swelling, and even dissolution. Thus, there is a need for a post synthesis process that stabilizes PIM-1 without compromising porosity.

Figure 47:
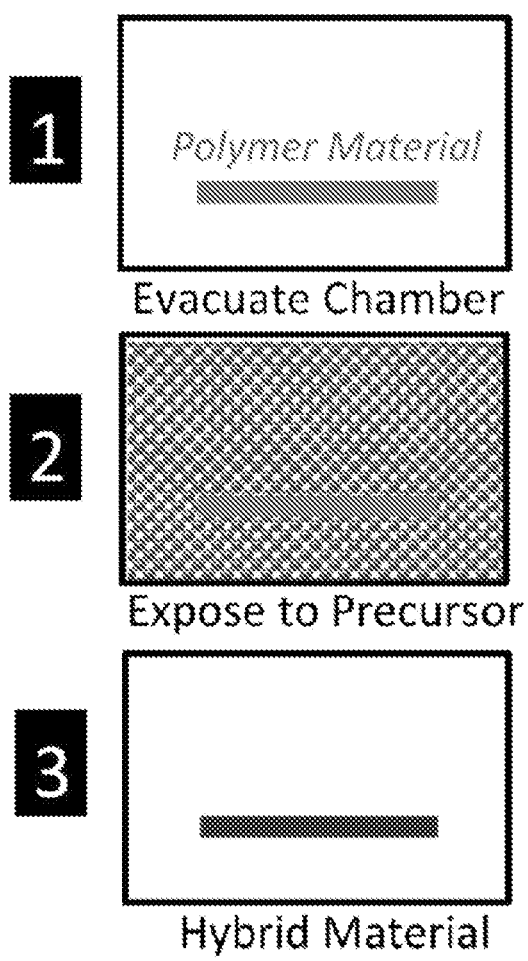
FIG. 47 is a schematic diagram of the steps in the VPI process.

Vapor phase infiltration is a process by which inorganic materials sorb, diffuse, and become entrapped within organic materials (FIG. 4 and FIG. 47): sorption comprises the dissolution of gaseous metalorganic precursor into the polymer; diffusion comprises migration of the sorbed precursor within the polymer; and entrapment comprises immobilization of the precursor through reaction or steric hindrance.

Described herein are highly stable organic-inorganic hybrid PIM-1 materials with chemical resistance made using vapor phase infiltration (VPI). During the vapor phase infiltration process, PIM-1 absorbs and traps inorganic material. The inorganic materials form networks throughout the PIM-1 and offer solvent resistance as well as potentially reducing the aging time by coating and "propping open" the micropores. This treatment does not significantly inhibit the mechanical properties of PIM-1, but it does increase the long-term stability and chemical durability. Infiltrated PIM materials can withstand concentrated solvents (e.g., tetrahydrofuran, chloroform, dichloromethane) for over a month, while the non-infiltrated PIMs dissolve within minutes. Because VPI can be used to infiltrate PIM-1 with different inorganic materials, new functionalities like catalysis are also possible.

The precursors used for the infiltration of PIM-1 were diethylzinc (DEZ), trimethyl aluminum (TMA), and titanium tetrachloride ($TiCl_4$). The hold times for the VPI process were 15 minutes, 2 hours, and 5 hours. The VPI process was repeated for 1, 2, 3, 5, or 10 total cycles. The infiltration temperatures used were 90° C. and 110° C.

Figure 48:
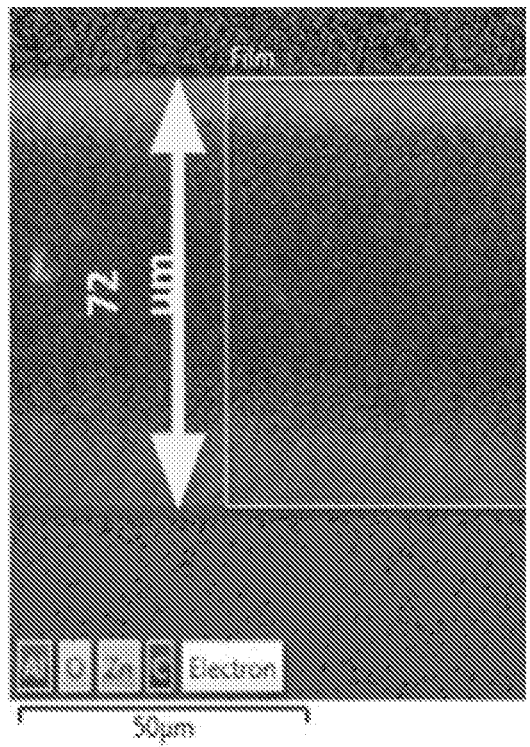
FIG. 48 is an EDX diagram of an infiltrated PIM-1 sample.
Figure 49:
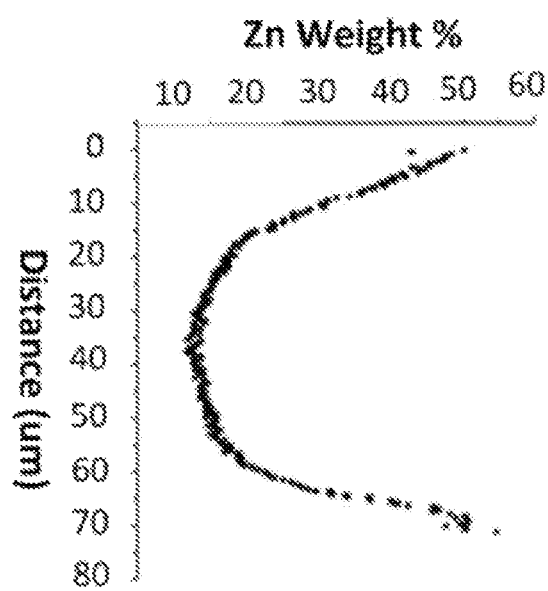
FIG. 49 is the zinc loading profile across the membrane shown in FIG. 48, showing that some level of infiltration was achieved throughout the entire.

The hybrid materials were characterized by SEM/EDX and XPS to confirm the form of the inorganics within PIM-1 and by BET Surface Area and Pore Size Distribution Analysis to investigate the effect of infiltration on microporosity. EDX analysis of an infiltrated PIM-1 sample showed that some level of infiltration was achieved throughout the entire sample (FIG. 48 and FIG. 49).

Figure 50:
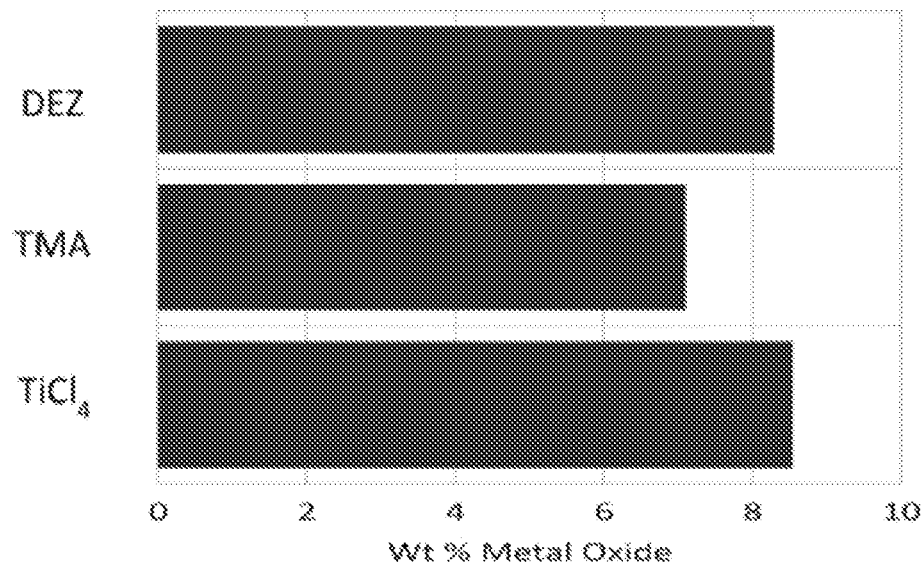
FIG. 50 is a graph of the amount of metal oxide loaded for an infiltration of PIM-1 at 90° C. with 300 minute holds and 2 cycles with precursors of diethylzinc (DEZ), trimethylaluminum (TMA), and titanium tetrachloride (TiCl$_4$).

Infiltration of PIM-1 at 90° C. with 300 minute holds and 2 cycles with precursors of DEZ, TMA and $TiCl_4$ showed that, with similar cycle numbers and hold times, all three precursor chemistries resulted in greater than 6 wt % loading of the metal oxide (FIG. 50).

Figure 51:
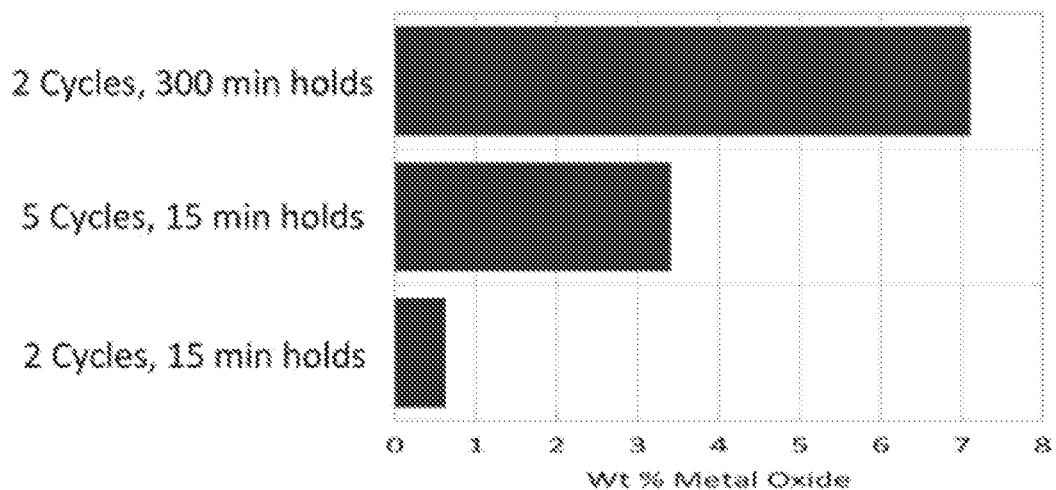
FIG. 51 is a graph of the amount of metal oxide loaded for an infiltration of PIM-1 with TMA and H$_2$O at 90° C. with various cycle numbers and hold times.

Infiltration of PIM-1 with TMA and $H_2O$ at 90° C. with various cycle numbers and hold times showed that both hold times and the number of cycles can play a significant role in the amount of metal oxide loaded in the hybrid material (FIG. 51).

Figure 52:
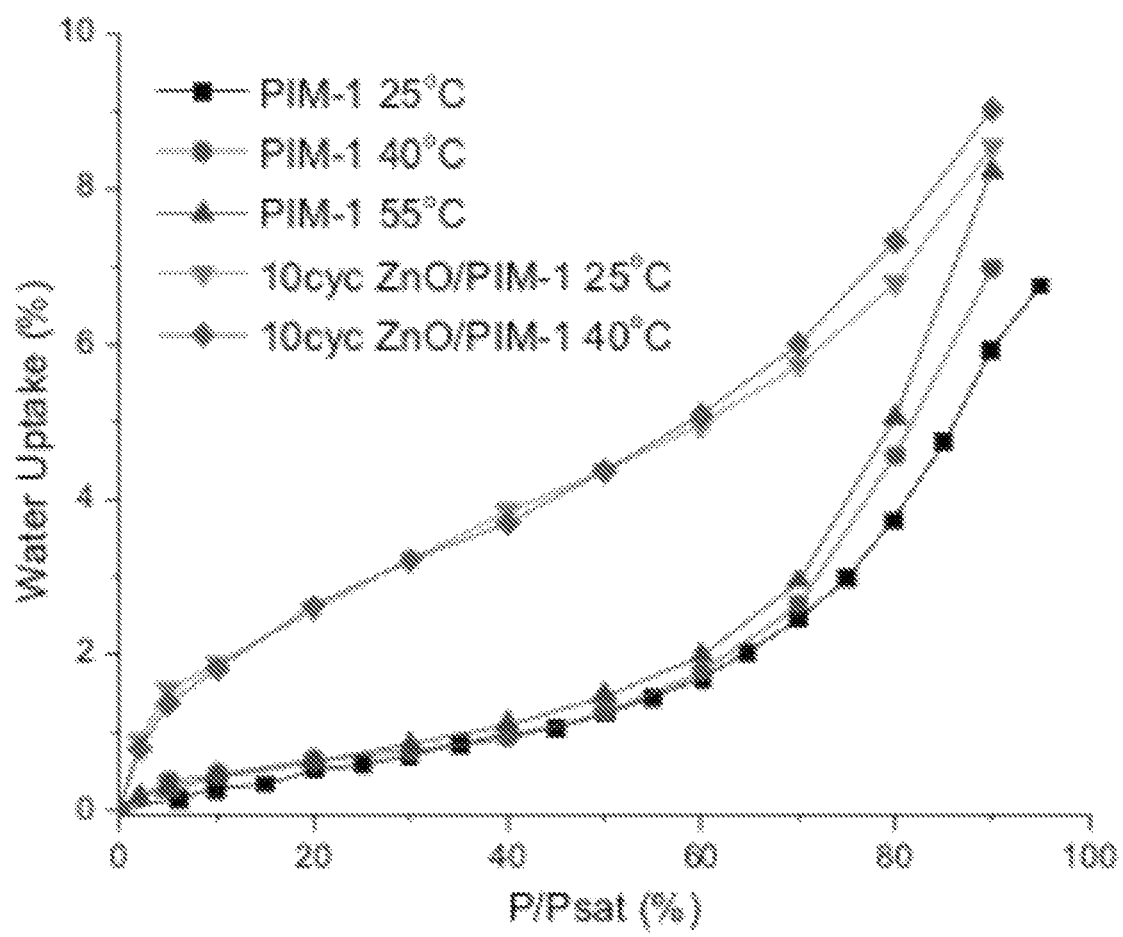
FIG. 52 is a plot of the water uptake for various PIM-1 samples, showing the effect of the VPI parameters on the hydrophilicity of PIM-1.
Figure 53:
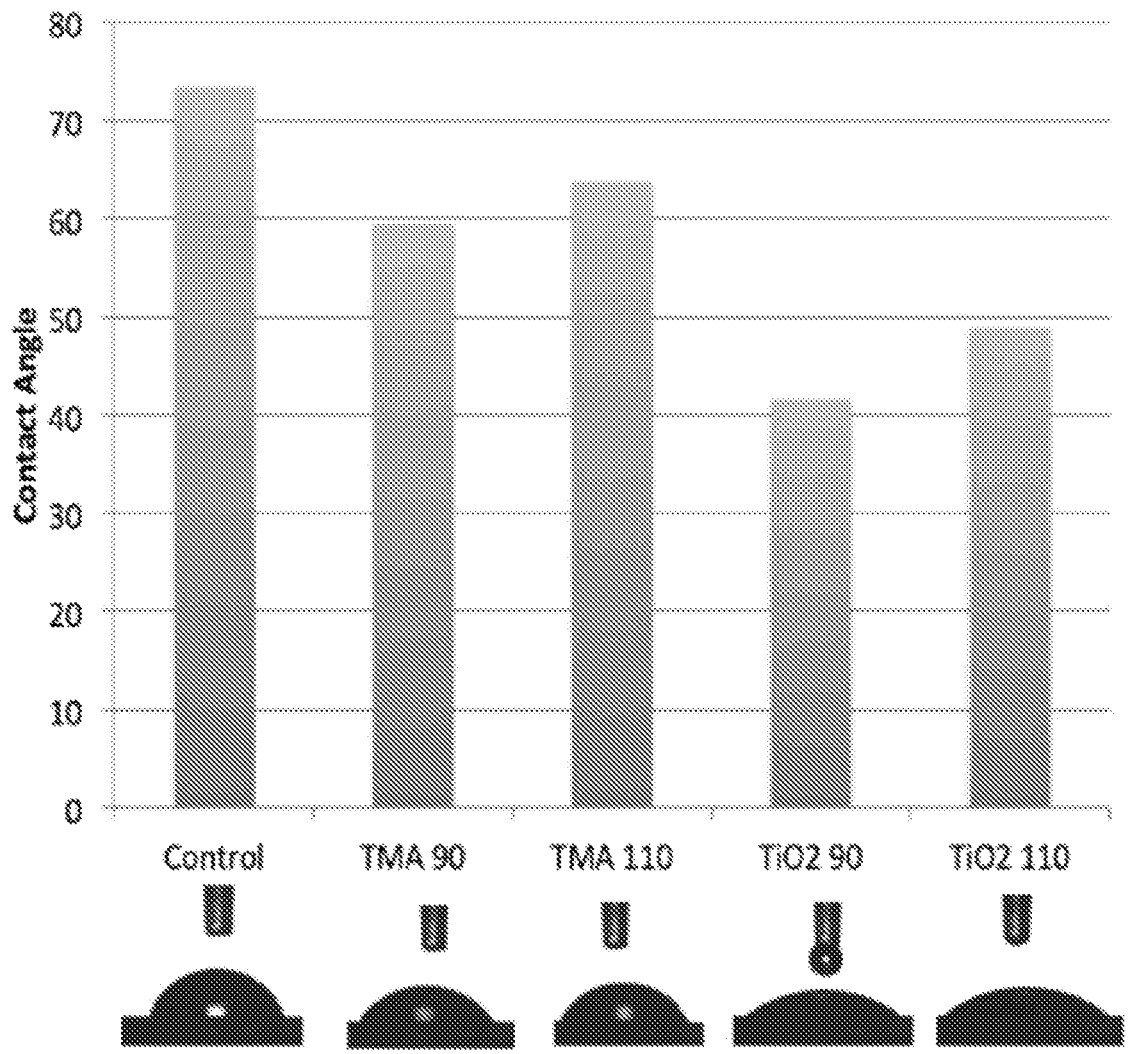
FIG. 53 shows the contact angle for various PIM-1 samples, showing the effect of the VPI parameters on the hydrophilicity of PIM-1.

The VPI parameters were also used to modify the hydrophilicity of PIM-1 (FIG. 52 and FIG. 53).

Figure 54:
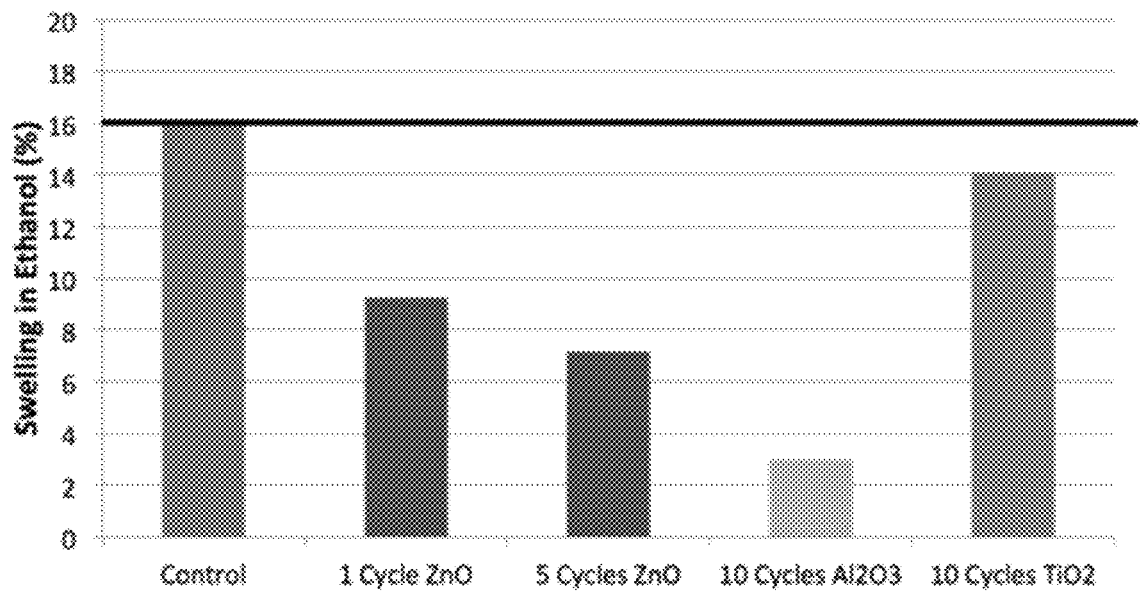
FIG. 54 shows the effect of ethanol on the swelling of various PIM-1 samples.

The effect of ethanol on a hybrid PIM-1 material was tested. First, ~100 nm PIM-1 films were prepared by spin coating a PIM-1/THF solution on silicon wafers. The PIM-1 films were then infiltrated in a VPI chamber under a variety of conditions (e.g., chemistry, reactor temperature, precursor hold times, and number of cycles were varied). The initial infiltrated film thickness was measured with an ellipsometer. The thickness of the films was then monitored over time via an ellipsometer upon exposure to ethanol to measure the effect of ethanol on the thickness of the membranes. The films were immersed in ethanol for 10 minutes, removed, air dried for 30 seconds, and then the thickness was measured with the ellipsometer. The prevention of swelling upon exposure to ethanol varied with infiltrant chemistry and number of cycles (FIG. 54).

Figure 55:
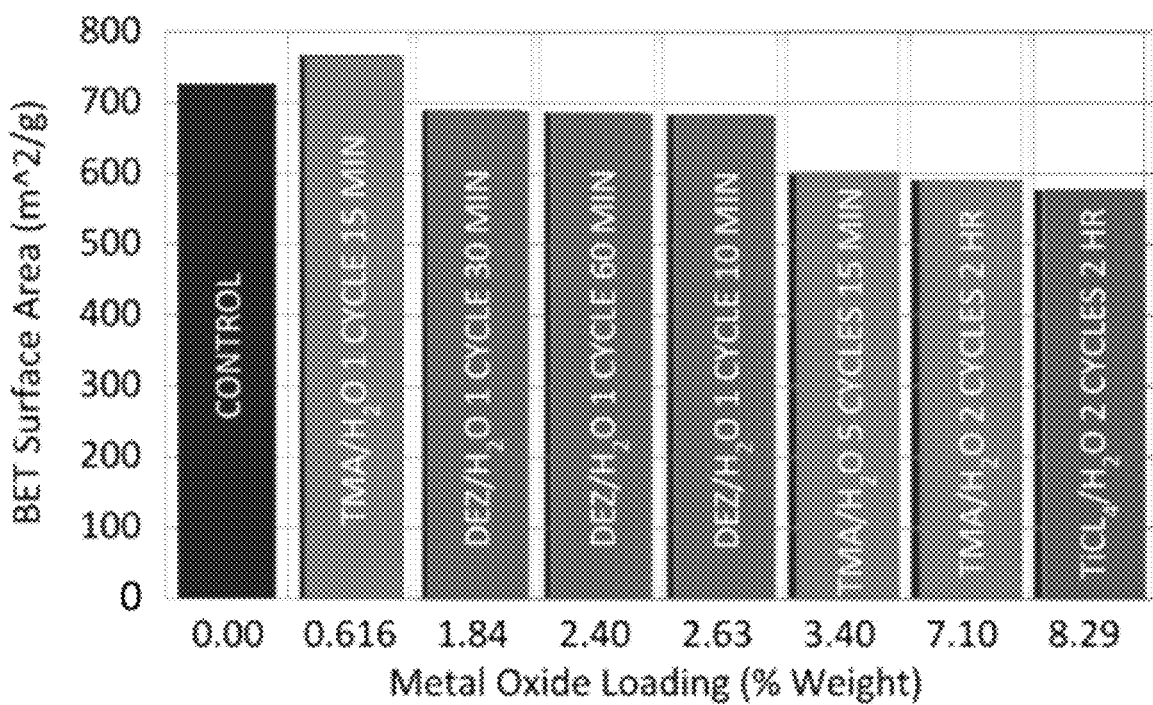
FIG. 55 shows that the VPI parameters can be used to balance the metal oxide loading with the effect on BET surface area of the hybrid samples.
Figure 56:
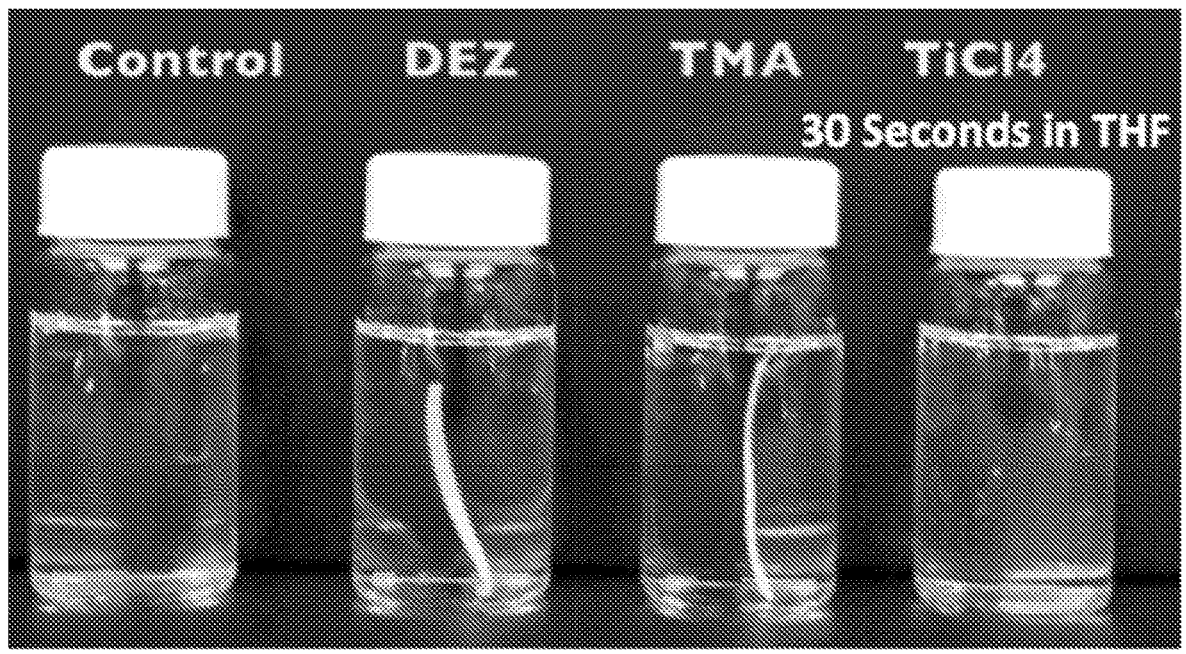
FIG. 56 shows the effect of immersing various PIM-1 samples in THF for 30 seconds.
Figure 57:
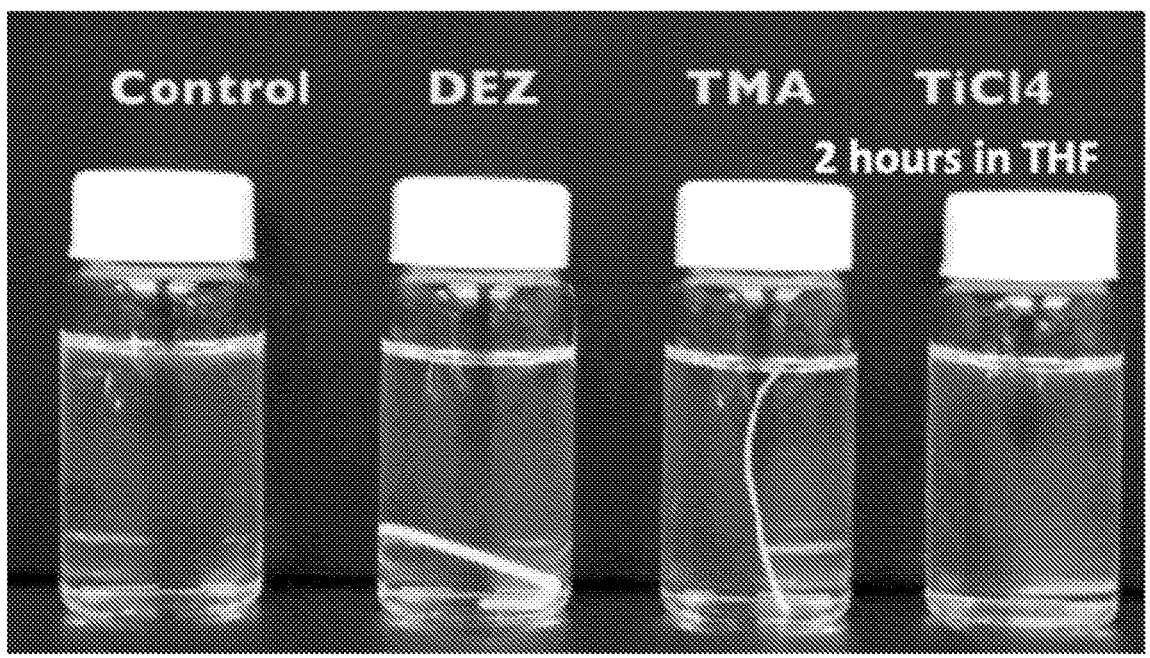
FIG. 57 shows the effect of immersing various PIM-1 samples in THF for 2 hours.
Figure 58:
FIG. 58 shows that a DEX infiltrated PIM-1 sample was stable after being immersed in THF for one week.
Figure 59:
FIG. 59 shows that a TMA infiltrated PIM-1 sample was stable after being immersed in THF for one week.
Figure 60:
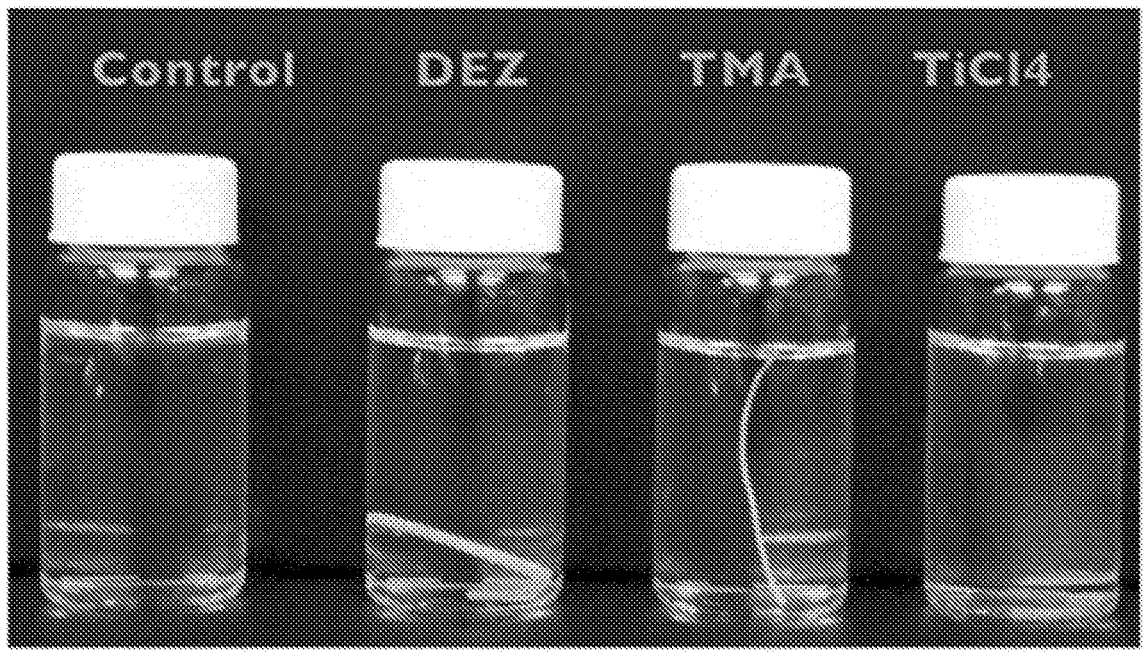
FIG. 60 shows the effect of immersing various PIM-1 samples in THF for one week.

The VPI parameters can be used to balance the metal oxide loading with the effect on BET surface area of the hybrid samples (FIG. 55).

The hybridized PIM-1 materials showed excellent solvent resistance and withstood immersion in THF (a strong solvent for PIM-1) for over a week (FIG. 56-FIG. 60). The vapor phase infiltration process can be optimized to balance decreases in pore size distribution with solvent/chemical resistance.

Herein, vapor phase infiltration of polymers was shown to create stable hybrid organic/inorganic materials with chemical resistance. By varying infiltration parameters, the materials were either fully or partially hybridized, thus expanding the application space of these materials. The VPI treatments did not significantly inhibit the typical characteristics of the polymer being infiltrated and therefore provided newfound stability with the maintenance of important properties. Infiltrated polymers were seen to withstand concentrated solvents for over a week whereas their non-infiltrated counterparts dissolve in minutes. These hybrid materials can also have increased resistance to aging and provide opportunities for tunable selectivity in fluid separations. These hybrid materials would be able to extend the applications of PIM-1 to new types of streams that deleteriously affect PIM-1. These materials could replace the expensive and energy intensive distillation columns currently in use in industry or be utilized as sensors of storage devices. Additionally, tunable guest interactions could be used to optimize PIM-1 for specific applications. The hybrid materials can be imbued with additional properties by further modifying the hybrid materials with other infiltrants (e.g., antimicrobial, fluorescence, hydrophilicity, etc.). Potential applications of the hybrid membranes include, for example, gas storage devices, sorbents, catalysis, sensors, separations.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A hybrid membrane comprising:
   a microporous polymer, the microporous polymer comprising a continuous polymer phase permeated by a continuous pore phase; and
   an inorganic material dispersed throughout the microporous polymer within the continuous pore phase;
   wherein the inorganic material comprises a metal oxide, a metal nitride, a metal carbide, a metal oxynitride, a metal oxycarbide, a metalloid oxide, a metalloid nitride, a metalloid carbide, a metalloid oxynitride, a metalloid oxycarbide, or a combination thereof; and
   wherein substantially no particles or crystals of the inorganic material are present in the hybrid membrane as determined by x-ray diffraction (XRD), transmission electron microscopy (TEM), or a combination thereof.

2. The hybrid membrane of claim 1, wherein the microporous polymer comprises a polymer of intrinsic microporosity (PIM), a hypercrosslinked microporous polymer (HCP), a covalent organic framework (COF), a conjugated microporous polymer (CMP), a porous aromatic framework (PAF), a porous organic cage (POC), derivatives thereof, or combinations thereof.

3. The hybrid membrane of claim 1, wherein the microporous polymer comprises a polymer of intrinsic microporosity (PIM) selected from the group consisting of PIM-1, PIM-2, PIM-3, PIM-4, PIM-5, PIM-6, PIM-7, PIM-8, PIM-9, PIM-10, KAUST-PI-1, KAUST PI-2, derivatives thereof, and combinations thereof.

4. The hybrid membrane of claim 1, wherein the inorganic material comprises a metal oxide, a metalloid oxide, or a combination thereof.

5. The hybrid membrane of claim 1, wherein the inorganic material comprises a metal or a metalloid selected from the group consisting of Al, Zn, Ti, Si, Hf, Zr, Ta, Y, Ge, As, Sb, Te, and combinations thereof.

6. The hybrid membrane of claim 1, wherein the inorganic material comprises ZnO, $Al_2O_3$, $TiO_2$, $SiO_2$, $HfO_2$, $ZrO_2$, $Ta_2O_5$, $Y_2O_3$, $Ir_2O_3$, $RuO_2$, $WO_3$, $Ni_2O_3$, or a combination thereof.

7. The hybrid membrane of claim 1, wherein the inorganic material is dispersed substantially homogeneously throughout the hybrid membrane.

8. The hybrid membrane of claim 1, wherein the inorganic material forms a continuous phase within the continuous pore phase.

9. The hybrid membrane of claim 1, wherein the inorganic material is unbound to the continuous polymer phase.

10. The hybrid membrane of claim 1, wherein the hybrid membrane comprises from 0.1 wt % to 35 wt % of inorganic material based on the weight of the hybrid membrane.

11. The hybrid membrane of claim 1, wherein the hybrid membrane has a BET surface area of from 200 m²/g to 2000 m²/g.

12. The hybrid membrane of claim 1, wherein the hybrid membrane is more stable in toluene, tetrahydrofuran, chloroform, dichloromethane, or a combination thereof than the corresponding microporous polymer in the absence of the inorganic material.

13. The hybrid membrane of claim 1, wherein the hybrid membrane has a lower toluene uptake at a $P/P^{sat}$ of 0.25 or more, a lower ethanol permeance, a lower n-heptane permeance, or a combination thereof than the corresponding microporous polymer in the absence of the inorganic material.

14. The hybrid membrane of claim 1, wherein the hybrid membrane is stable in tetrahydrofuran, chloroform, dichloromethane, or a combination thereof for 1 day or more.

15. A method of making the hybrid membrane of claim 1, the method comprising infiltrating the microporous polymer with the inorganic material using vapor phase infiltration.

16. The method of claim 15, wherein the vapor phase infiltration comprises exposing the microporous polymer to a metal-organic precursor, thereby forming an impregnated membrane, and exposing the impregnated membrane to an oxidant comprising water, oxygen, or a combination thereof, thereby forming the inorganic material comprising a metal oxide.

17. The method of claim 15, wherein the hybrid membrane is formed in situ in a membrane module.

18. A method of use of the hybrid membrane of claim 1, the method comprising using the hybrid membrane in a gas storage device, in a sensor, as a sorbent, as a catalyst support, or a combination thereof.

19. A method of use of the hybrid membrane of claim 1 in a membrane separation, wherein the method comprises contacting the hybrid membrane with a composition to separate one or more components from the composition.

20. The method of claim 19, wherein:
the hybrid membrane exhibits better separation performance than the corresponding microporous polymer in the absence of the inorganic material;
the hybrid membrane exhibits a higher rejection of a sorptive solute than the corresponding microporous polymer in the absence of the inorganic material;
the hybrid membrane rejects more dye in a dye separation than the corresponding microporous polymer in the absence of the inorganic material;
the hybrid membrane exhibits a better size-based separation performance in plasticizing solvents than the corresponding microporous polymer in the absence of the inorganic material;
the hybrid membrane exhibits a lower molecular weight cutoff for a size-based separation than the corresponding microporous polymer in the absence of the inorganic material;
or a combination thereof.

* * * * *

UNITED STATES PATENT AND TRADEMARK OFFICE
CERTIFICATE OF CORRECTION

PATENT NO. : 11,680,146 B2
APPLICATION NO. : 16/760125
DATED : June 20, 2023
INVENTOR(S) : Losego et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this
Thirty-first Day of December, 2024

Derrick Brent
*Acting Director of the United States Patent and Trademark Office*